United States Patent [19]
Leuer

[11] Patent Number: 6,054,913
[45] Date of Patent: Apr. 25, 2000

[54] CURRENT FLOW SWITCHING DEVICE FOR COMBINED FUNCTION MAGNETIC FIELD PRODUCTION

[75] Inventor: James A. Leuer, Encinitas, Calif.

[73] Assignee: General Atomics, San Diego, Calif.

[21] Appl. No.: 08/959,012

[22] Filed: Oct. 28, 1997

[51] Int. Cl.[7] .................................................. H01F 6/00
[52] U.S. Cl. ........................ 335/299; 335/216; 336/229
[58] Field of Search ............................. 174/68.1, 125.1; 335/216, 296, 299; 307/1, 2, 26; 376/121, 133, 142; 505/856, 879, 880

[56] References Cited

U.S. PATENT DOCUMENTS

| | | | |
|---|---|---|---|
| 4,098,643 | 7/1978 | Brown . | |
| 4,330,864 | 5/1982 | Ohyabu | 376/133 |
| 4,363,773 | 12/1982 | Mine | 376/142 |
| 4,472,344 | 9/1984 | Lofstedt | 376/142 |
| 4,615,860 | 10/1986 | Schaffer | 376/133 |
| 4,774,048 | 9/1988 | Yang | 376/142 |
| 4,897,558 | 1/1990 | Tidman . | |
| 4,906,861 | 3/1990 | Roy et al. | 307/138 |
| 5,105,098 | 4/1992 | Gattozzi . | |
| 5,148,046 | 9/1992 | Hilal . | |
| 5,198,181 | 3/1993 | Jacobson | 376/132 |
| 5,241,447 | 8/1993 | Barber et al. | 361/141 |
| 5,336,975 | 8/1994 | Goebel et al. . | |
| 5,353,314 | 10/1994 | Schaffer | 376/134 |
| 5,376,626 | 12/1994 | Drehman et al. | 505/234 |
| 5,543,769 | 8/1996 | Goren et al. | 335/216 |

*Primary Examiner*—Lincoln Donovan
*Assistant Examiner*—Raymond Barrera
*Attorney, Agent, or Firm*—Fitch, Even, Tabin & Flannery

[57] ABSTRACT

An apparatus for creating and controlling a toroidal magnetic field, and a poloidal magnetic field employs a conductive sheet rolled into a spiral with cut outer legs aligned and bent outwardly toward a position approximately adjacent to corresponding other cut outer legs. Such apparatus is formed by forming a conductive sheet; cutting a first plurality of cut outer legs into the sheet; cutting a second plurality of cut outer legs into the sheet; rolling the conductive sheet into a spiral; and bending outwardly each of the cut outer legs. In an alternative, the apparatus has a conductive tube with each of a first plurality cut outer legs bent outwardly to couple to corresponding ones of a second plurality of cut outer legs. Such alternative is made by forming a conductive tube; cutting a plurality cut outer legs at one of the conductive tube; cutting another plurality cut outer legs at another of the conductive tube; bending outwardly the cut outer legs; and coupling ones of the plurality of cut outer leg to corresponding ones of the other plurality of cut outer legs. The above mentioned devices may include a spiral resistive strip or thermally induced resistive spiral in a centerpost region.

28 Claims, 16 Drawing Sheets

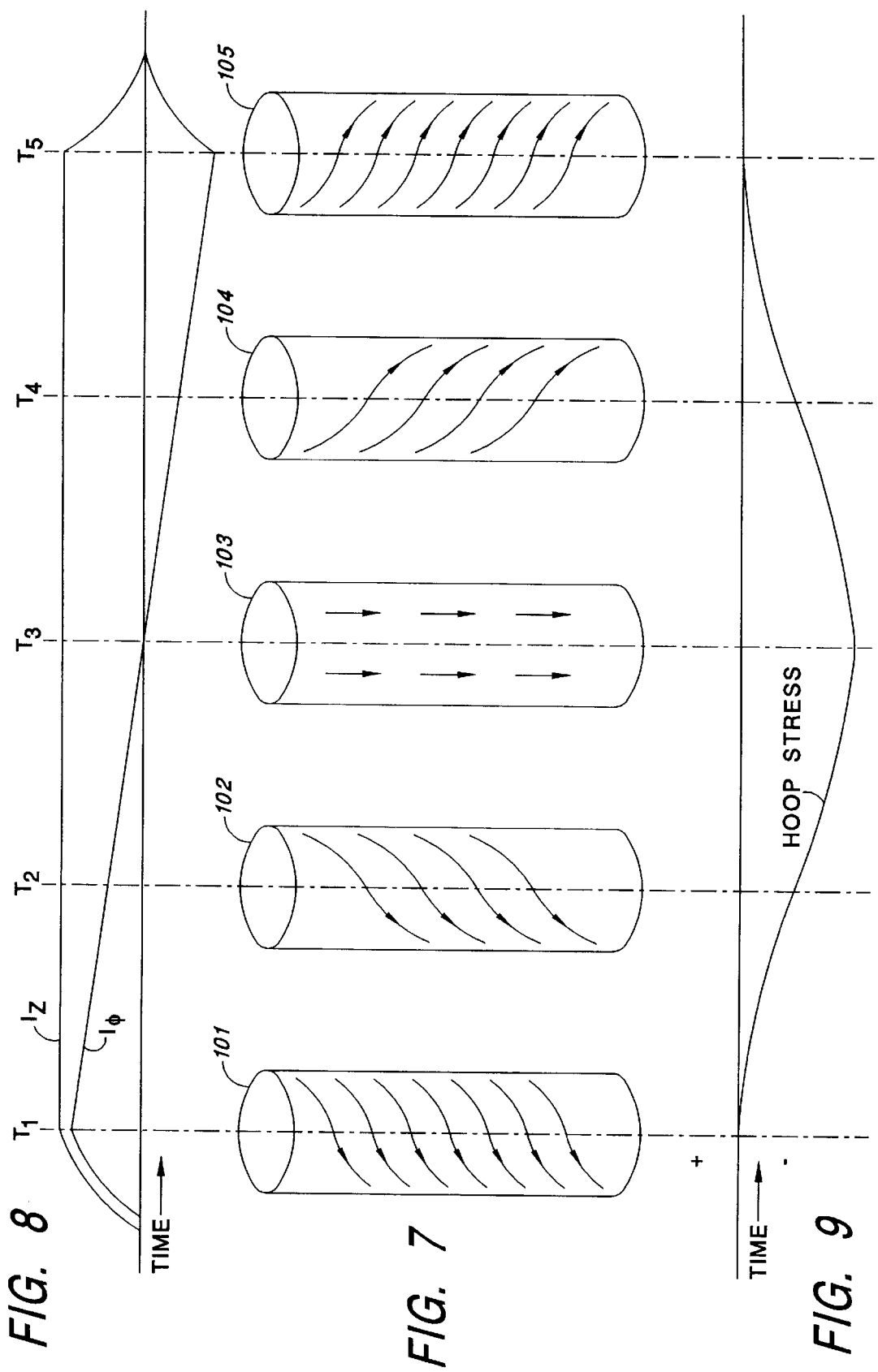

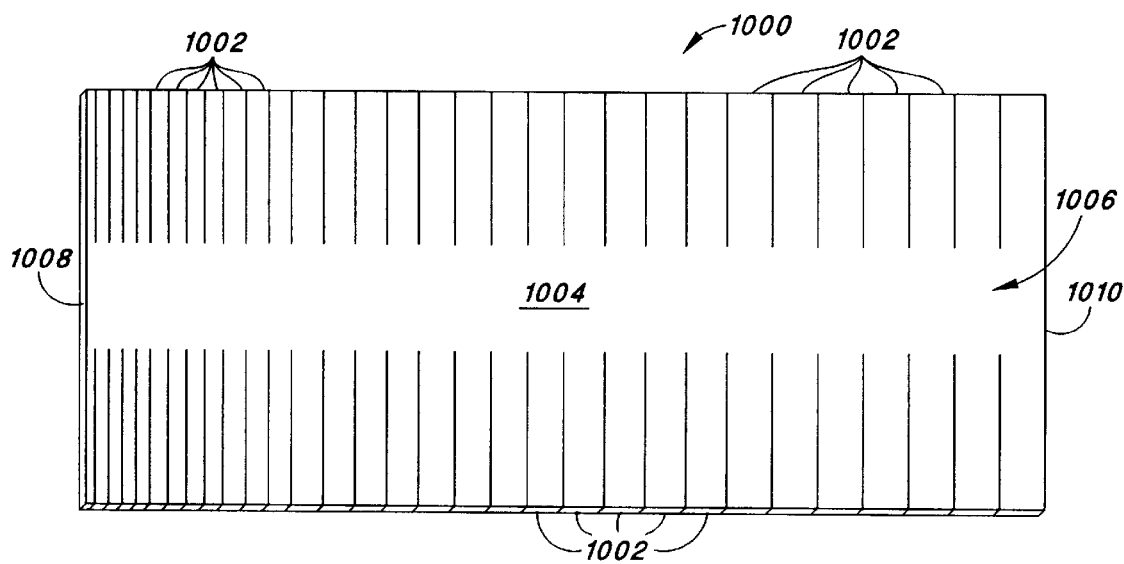
FIG. 10
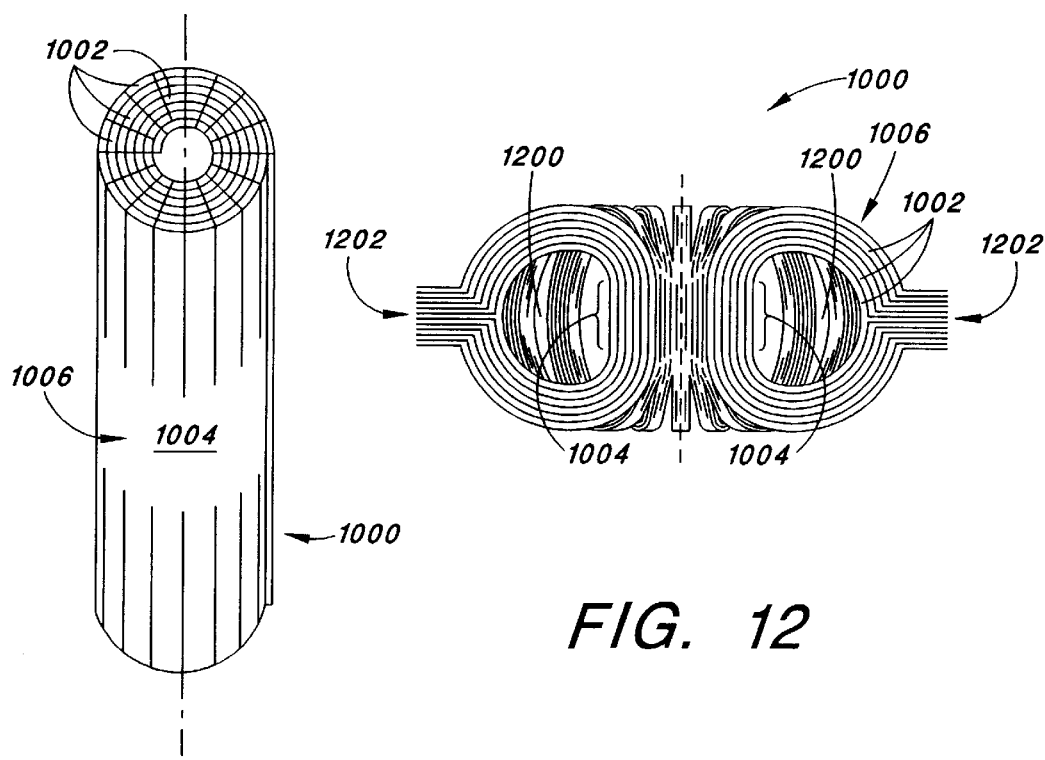
FIG. 11
FIG. 12

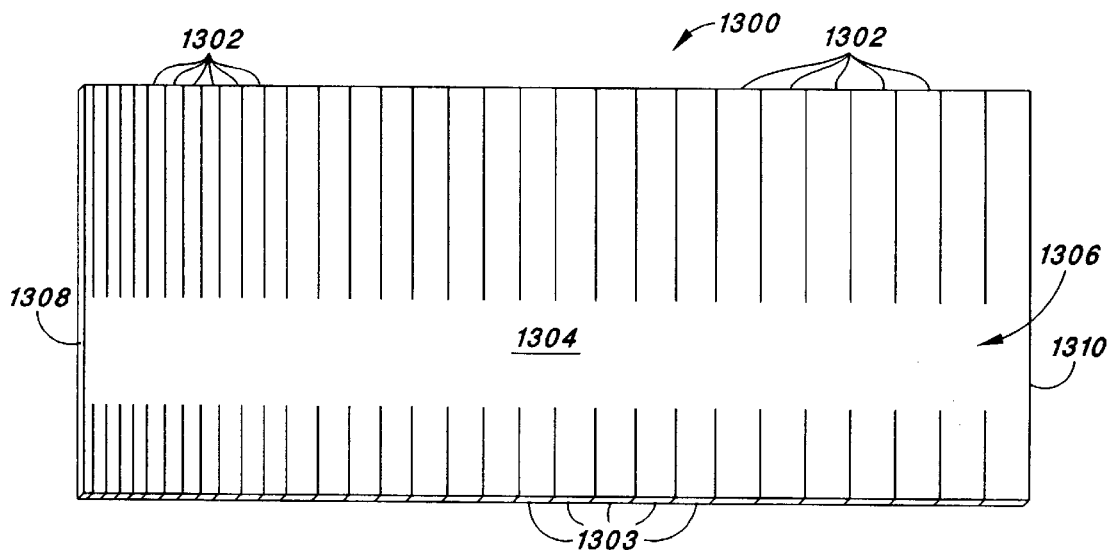
FIG. 13
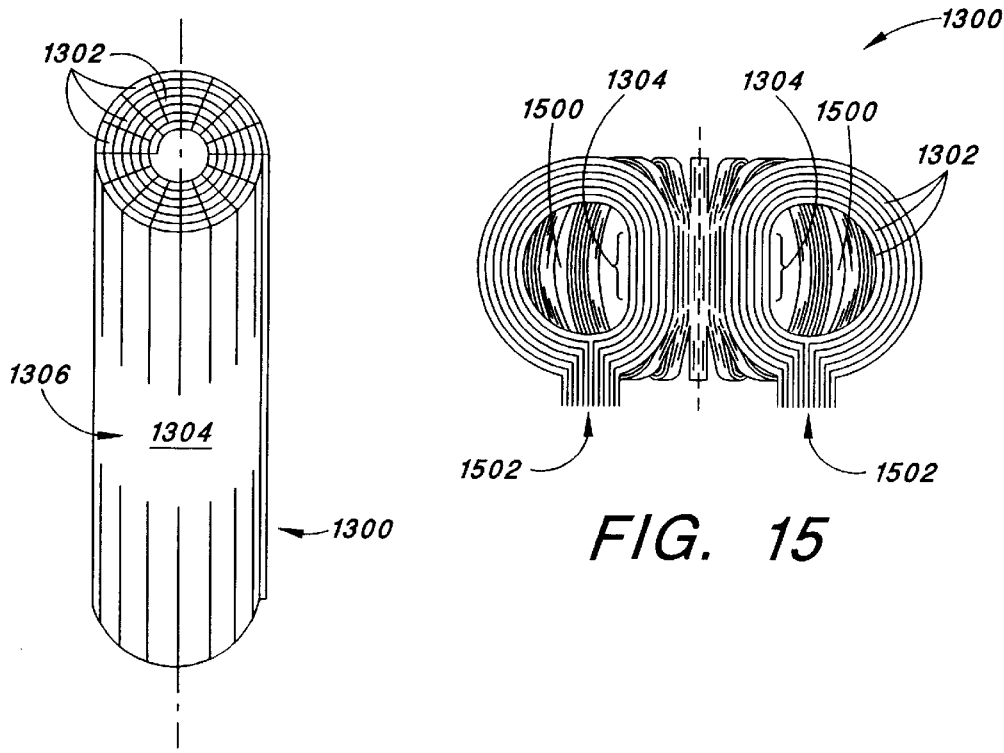
FIG. 14
FIG. 15

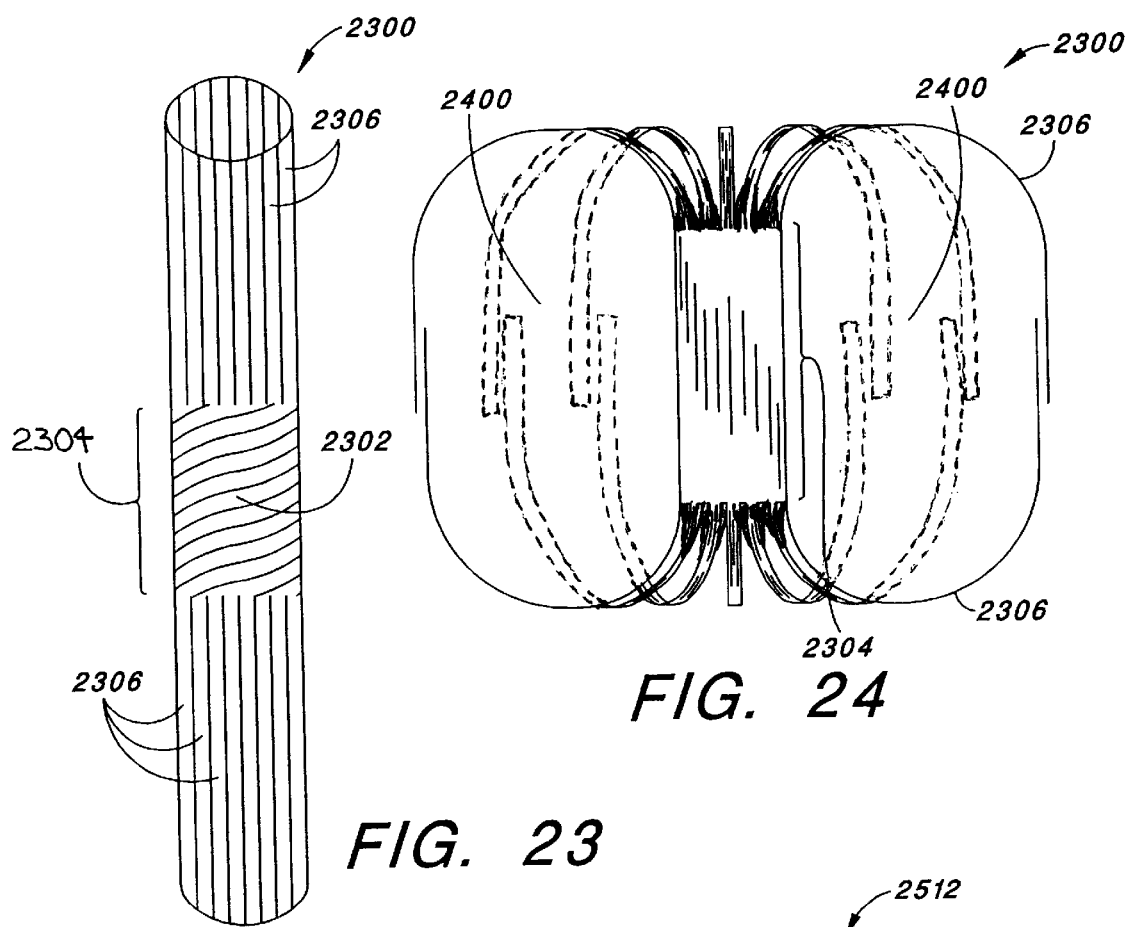
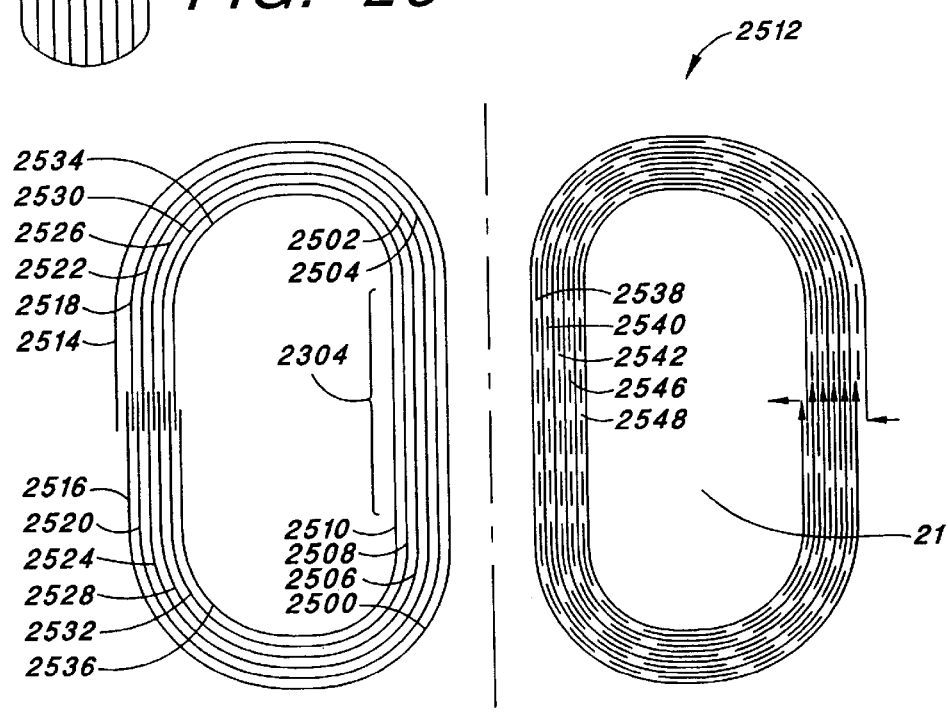

CURRENT FLOW SWITCHING DEVICE FOR COMBINED FUNCTION MAGNETIC FIELD PRODUCTION

BACKGROUND OF THE INVENTION

The present invention relates to electric current conducting mechanisms for controlling a magnetic field in a high magnetic field device. More particularly, the present invention relates to current conducting and switching mechanisms for conducting axial and toroidal currents for controlling a magnetic field in a high magnetic field device. Even more particularly, the present invention relates to current conducting and switching mechanisms for conducting axial and toroidal currents for creating and controlling a toroidal magnetic field in a toroidal region, and a time-varying axial or poloidal magnetic field, which in turn produces a toroidal electric field, in a high magnetic field device, such as, for example, a tokamak fusion reactor (TFR).

The main elements of a heretofore known tokamak fusion reactor (TFR) 20 are shown in FIGS. 1, 2, 3 and 4. The TFR 20 includes a vacuum vessel 21 in the shape of a torus. A major axis 22 of a cylindrical coordinate system 19 (see FIG. 2) is a straight line centered in a hollow center 25 (or bore) of the toroidal vacuum vessel 21 (FIG. 1), i.e., inside the "doughnut hole", and a minor axis 24 of such coordinate system is a circle lying in a plane normal to the major axis 22 and at a center of a core of the toroidal vacuum vessel 21. The major axis 22 extends in a z-direction and the minor axis 24 is a distance $R_o$ from the major axis 22. Points along the minor axis 24 are defined by an angle φ. Walls of the torodial vacuum vessel 21 are defined with respect to the minor axis 24 by another radius r and an angle θ. A centerpost region 23, for example, in a TFR is defined as a cylindrical volume centered on the major axis 22 and extending radially to an innermost cylinder of the vacuum vessel 21.

The present invention relates to a novel and nonobvious approach for conducting and controlling currents in this centerpost region 23 or in a similar region.

Referring to FIG. 3, large magnetic field coils 26 (FIG. 1), commonly referred to as toroidal field (TF) coils 26 or B-coils 26, envelope the minor axis 24 and the toroidal vacuum vessel 21, with part of a current $I_z$ carried by the B-coils 26 being in the centerpost region 23. This B-coil 26 when energized with the current $I_z$, produces a strong toroidal magnetic field $B_\phi$ that is oriented parallel to the minor axis 24 encircling the major axis 22. The strong toroidal magnetic field $B_\phi$ is used in, for example, a TFR to contain high-temperature deuterium-tritium plasma to promote nuclear fusion of the deuterium-tritium mixture.

Referring to FIG. 4, a toroidal plasma current $I_p$ that flows through the high-temperature plasma in a TFR generally flows in a toroidal direction (i.e., parallel to the minor axis 24) and is needed to improve plasma confinement and provide initial heating of the high-temperature plasma. This plasma current $I_p$ is conventionally driven by a transformer system.

In order to produce the plasma current $I_p$ in the transformer system, a time-varying current $I_\phi$ flows through an electric field coil 28, or E-coil 28, also commonly referred as an ohmic heating coil (or OH coil). The E-coil 28 serves as a primary winding of the transformer system and serves to induce the plasma current $I_p$ in the plasma, which is in-effect the transformer's secondary winding. This plasma current $I_p$ is induced by a toroidal electric field $E_\phi$ in the plasma generated in response to the time-varying current $I_\phi$. The E-coil 28 is positioned principally within the centerpost region 23 and inside the bore of the vacuum vessel 21.

The transformer system thus provides an inductive voltage for generating and driving the plasma current $I_p$. The plasma current $I_p$ in turn provides resistive (or ohmic) heating of the plasma. Other systems for additional heating of the plasma in a TFR are known in the art.

The plasma current $I_p$ generates a relatively constant poloidal magnetic field $B_\theta$, and, when combined with the toroidal magnetic field $B_\phi$, provides a spiral field line geometry located on closed toroidal surfaces within the plasma (the surfaces of constant magnetic flux are closed about the minor axis 24).

Referring to FIG. 5, the B-coil 26 (also referred to as the TF coil, or toroidal magnetic field coil) and E-coil 30 (also referred to as the OH coil, or ohmic heating coil), in accordance with heretofore known approaches, are separate coils partially occupying the centerpost region 23 (FIG. 1) inside the bore of the toroidal vacuum vessel 21 (FIG. 1).

A combination of the toroidal magnetic field $B_\phi$ with the poloidal magnetic field $B_\theta$ provide spiral (or helix-like) magnetic flux lines that generally lie on closed nested magnetic surfaces in the toroidal vacuum vessel 21 (FIG. 1).

Ions and electrons within the plasma rotate about the toroidal magnetic field $B_\phi$ and flow generally along the minor axis 24 (FIG. 2). As a result, the ions and electrons follow a spiraling path around the toroidal vacuum vessel 21 (FIG. 21) confining the particles away from the wall of the toroidal vessel 21 (FIG. 1).

The magnetic fields, i.e., the toroidal magnetic field $B_\phi$ and the poloidal magnetic field $B_\theta$, within the TFR provide an inward force that substantially overcomes outward pressure of the plasma and significantly confines the plasma's flow to within the toroidal vacuum vessel 21 (FIG. 1). Additionally in heretofore known approaches, plasma positioning is accomplished using poloidal field shaping coils 30 (FIG. 1).

Referring to FIG. 6, with the constant current $I_z$ flowing in the B-coils 26 (FIG. 1), the resulting toroidal magnetic field $B_\phi$ interacts with the constant current $I_z$ to produce an approximately constant force $F_B$ in the centerpost region 23 (FIG. 1). The constant force $F_B$ is directed radially toward the major axis 22 of the TFR. Another approximately radial force is directed away from the major axis 22 of the toroidal vacuum vessel 21 and varies over time. This time-varying force $F_E$ is produced by an interaction between the time-varying current $I_\phi$ flowing through the E-coil 30 and an axial component of the poloidal magnetic field $B_\theta$ produced by the E-coil 30.

Previous efforts have attempted to configure the E-coil 30 and the B-coil 26 such that the constant force $F_B$ and the time-varying force $F_E$ react at an interface 27 between the E-coil 30 and the B-coil 26 and effectively cancel, for certain magnitudes of the constant current $I_z$ and the time-varying current $I_\phi$.

The size of the TFR is critically dependent on a radial extent of the centerpost region 23 (FIG. 1). The size of the centerpost region 23 (FIG. 1) determines a capacity of the centerpost region 23 (FIG. 1) to carry the constant current $I_z$ and time varying current $I_\phi$. The strength of the material in this region and its ability to easily conduct current ultimately limit the strength of the fields that can be produced in the TFR and thus the ability of the TFR to confine the high-temperature plasma.

Accordingly, there exists a need for improvements in current conducting and switching mechanisms for controlling a magnetic field in a high magnetic field device, such as a TFR, that, for a given centerpost region size, allow greater plasma containment forces to be generated by current flowing through the centerpost region than has been heretofore achievable using the above-described approaches.

SUMMARY OF THE INVENTION

The present invention is directed to current conducting and switching mechanisms for conducting axial and toroidal currents for creating and controlling a toroidal magnetic field in a toroidal region, and an axial or poloidal magnetic field, which if time varying, produces a toroidal electric field, in a magnetic field device, such as, for example, a tokamak fusion reactor (TFR).

In one embodiment, the invention can be characterized as an apparatus for creating and controlling a toroidal magnetic field, and a poloidal magnetic field, in a magnetic field device. The apparatus in one embodiment comprises a conductive sheet rolled into a spiral with each of a first plurality cut outer legs aligned and bent outwardly toward a position approximately adjacent to corresponding ones of a second plurality of cut outer legs.

In another embodiment, the invention can be characterized as an apparatus for creating and controlling a toroidal magnetic field, and a poloidal magnetic field, in a high magnetic field device, wherein the apparatus comprises a conductive tube (which may be normally conducting or superconducting, in accordance with variations of the present embodiment) with each of a first plurality cut outer legs bent outwardly to couple to corresponding ones of a second plurality of cut outer legs.

In a further embodiment, the invention can be characterized as a method of making an apparatus for creating and controlling a toroidal magnetic field, and a poloidal magnetic field, in a high magnetic field device. Such method involves forming a conductive sheet; cutting a first plurality of cut outer legs into a first edge of the conductive sheet; cutting a second plurality of cut outer legs into a second edge of the conductive sheet, the second edge being opposite the first edge; rolling the conductive sheet into a spiral with each of the first plurality cut outer legs aligned with another of said first plurality of legs, the one of the first plurality of legs and the other of the first plurality of legs being at adjacent wraps of the spiral; bending outwardly each of the first plurality of legs; and bending outwardly each of the second plurality of legs toward a position approximately adjacent to corresponding ones of the first plurality of cut outer legs.

In yet a further embodiment, the invention can be characterized as a method of making an apparatus for creating and controlling a toroidal magnetic field, and a poloidal magnetic field, in a high magnetic field device. This method includes forming a conductive tube; cutting a first plurality cut outer legs at one of the conductive tube; cutting a second plurality cut outer legs at another of the conductive tube; bending outwardly the first plurality of cut outer legs; bending outwardly the second plurality of cut outer legs; and coupling ones of the first plurality of cut outer legs to corresponding ones of the second plurality of cut outer legs.

BRIEF DESCRIPTION OF THE DRAWINGS

The above and other aspects, features and advantages of the present invention will be more apparent from the following more particular description thereof, presented in conjunction with the following drawings, wherein:

FIG. 7 is a schematic diagram of current flowing in the centerpost region at different times for a constant axial current $I_z$ and a time-varying toroidal current $I_\phi$;

FIG. 8 is a graph of a constant axial current $I_z$ and a time-varying toroidal current $I_\phi$ flowing in a centerpost region of FIG. 7 versus time;

FIG. 9 is a graph of compressive stresses induced by the constant axial current $I_z$ and the time-varying toroidal current $I_\phi$ flowing in the centerpost region of FIG. 7 versus time;

FIG. 10 is a plan view of a conductive sheet having cut outer legs along its edges, a centerpost region thereinbetween, and an insulated surface for constructing a magnetic field coil, in accordance with one embodiment of the present invention;

FIG. 11 is a perspective view of the conductive sheet of FIG. 10 having been rolled with its cut outer legs aligned;

FIG. 12 is a cross-sectional elevation view showing a magnetic field coil (also referred to herein as a spiraled or coiled magnetic field coil) formed from the conductive sheet of FIG. 10 with corresponding pairs of legs at each of its ends bent to form loops of a toroidal field coil that allow connection to a current supply at a mid-plane joint;

FIG. 13 is a plan view of a variation of the conductive sheet of FIG. 10 having cut long outer legs along one edge, cut short outer legs along another edge, a centerpost region thereinbetween, and an insulated surface for constructing a magnetic field coil, in accordance with a further embodiment of the present invention;

FIG. 14 is a perspective view of the conductive sheet of FIG. 13 having been rolled with its cut outer legs aligned;

FIG. 15 is a cross-sectional elevation view showing of a magnetic field coil (also referred to herein as a spiraled or coiled magnetic field coil) formed from the conductive sheet of FIG. 14 with corresponding pairs of legs at each of its ends bent to form loops of a toroidal field coil that allows for connection to a power supply at a bottom joint;

FIG. 23 is a perspective view of a conductive tube having a resistive spiral centerpost region and having several outer leg cuts at each of its ends, in accordance an embodiment of the present invention;

FIG. 24 is a cross-sectional side view of the conductive tube of FIG. 23, with corresponding pairs of legs at each of its ends bent to form loops of a toroidal field coil;

FIG. 25 is a cross-sectional elevation view showing several concentrically aligned conductive tubes, such as the conductive tube in FIG. 23, that together form a magnetic field coil, for carrying the constant current $I_z$ and the time-varying current $I_\phi$ that produce a toroidal magnetic field $B_\phi$ and a poloidal magnetic field $B_\theta$, in accordance with an embodiment of the present invention;

Corresponding reference characters indicate corresponding components throughout the several views of the drawings.

Description of Symbols Used

Figure 1:
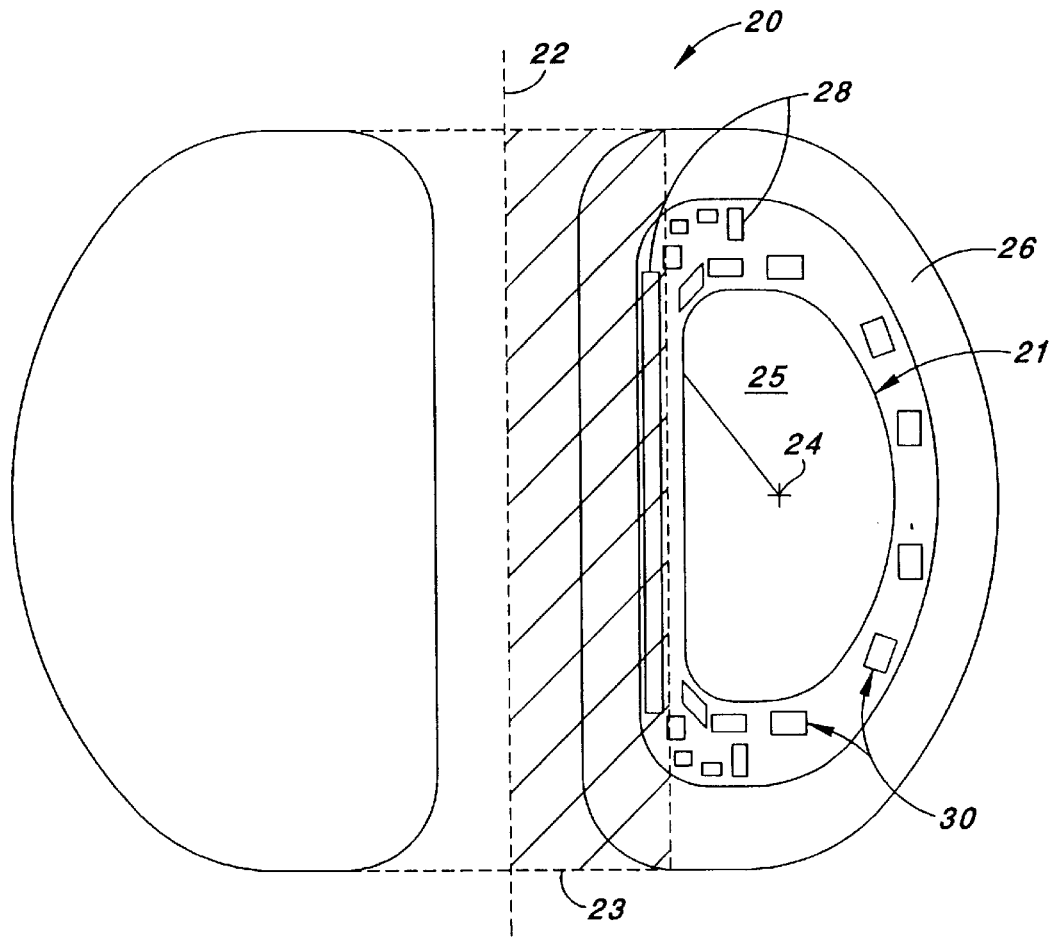
FIG. 1 is a cross-sectional side view of a toroidal fusion reactor (TFR) in accordance with the prior art.
Figure 2:
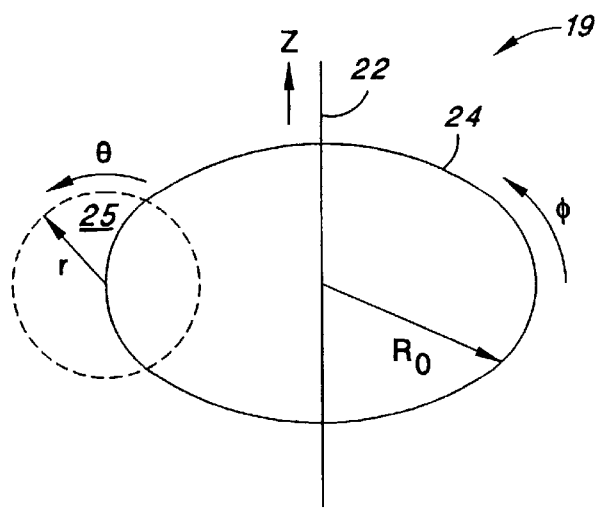
FIG. 2 defines major and minor axes associated with the TFR of FIG. 1.
Figure 3:
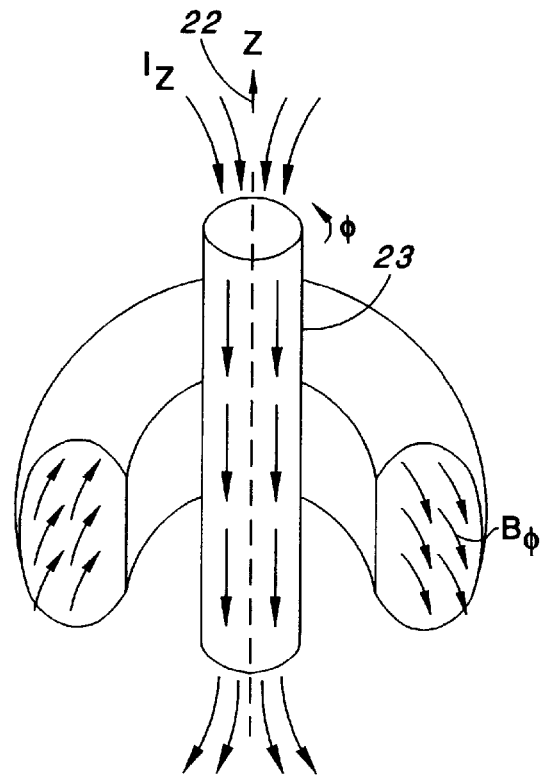
FIG. 3 is a perspective view of a toroidal plasma region partially in cross-section, and a centerpost region showing an axial current $I_z$ and a toroidal magnetic field $B_\phi$.
Figure 4:
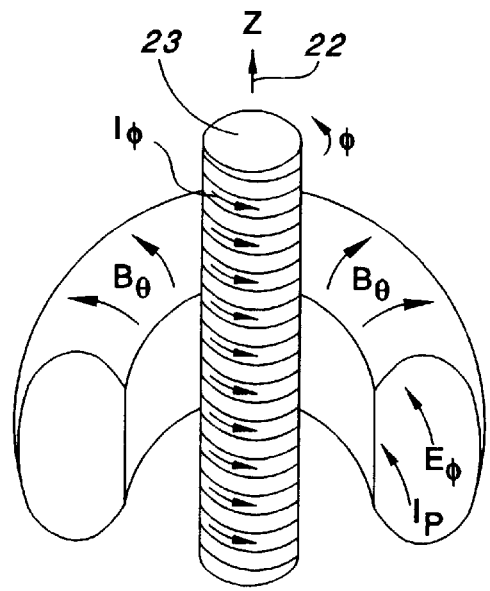
FIG. 4 is a perspective view of a toroidal plasma region partially in cross-section, and the centerpost region showing a toroidal current $I_\phi$, along with a plasma current $I_p$, a torodial electric field $E_\phi$ such as would be generated if the toroidal current $I_\phi$ is time varying, and a poloidal magnetic field $B_\theta$.

The following sets forth definitions for symbols used below in the Detailed Description of the Preferred Embodiments:

R=radial component of R, Z, $\phi$ coordinate system;

z=axial components of R, Z, $\phi$ coordinate system;

$\phi$=angular or toroidal component of r, z, $\phi$ coordinate system;

$R_o$=radial distance to center of minor axis;

$\theta$=angular measure from center of minor axis;

$B_\phi$=toroidal magnetic field;

$I_z$=axial current in centerpost region;

$I_p$=toroidal current in plasma;

$E_\phi$=toroidal electric field;

$B_\theta$=poloidal magnetic field with components $B_r$ & $B_z$;

r=minor radius measured length in radial direction from minor axis and at angle $\theta$;

$F_B$=force in the radial direction in the centerpost region from axial current of the B-coil (or TF coil);

$F_E$=radial force in the centerpost region from toroidal current of the E-coil (or ohmic heating coil);

$T_1$, $T_2$, $T_3$, $T_4$, $T_5$=different times during operation of device;

$V_1$, $V_2$=voltages at different axial locations of centerpost region;

L=length of centerpost in axial direction;

$E_z$=axial electric field;

J=current density;

γ=pitch angle;

$γ_J$=current density pitch angle;

X=Cartesian coordinate in orthogonal X, Y coordinates;

Y=Cartesian coordinate in orthogonal x, y coordinates;

$J_φ$=toroidal current density;

$J_z$=axial current density;

β=geometrical pitch=tan γ;

$β_J$=current density pitch=tan $γ_J$=$J_φ$/$J_z$;

$W_1$=width of conductive region;

$W_2$=width of resistive region;

$σ_1$=electrical conductivity of conductive region;

$σ_2$=electrical conductivity of resistive region (or strip);

$β_{jmax}$=maximum current density pitch;

$β_{max}$=geometrical pitch at maximum current density pitch;

$J_1$=current density in the conductive region;

$J_2$=current density in the resistive region;

$B_{φo}$=toroidal field at center of minor axis;

$μ_o$=permeability of free space=4 $π×10^7$ T/(A-m);

$R_+$=outer radial extent of centerpost;

$R_-$=inner radial extent of centerpost;

$\overline{S}$=average toroidal stress (hoop stress);

$R_{E-}$=inner radius of E-coil (or ohmic heating coil);

$R_{E+}$=outer radius of E-coil (or ohmic heating coil);

$Δφ_z$=axial or poloidal flux [Weber];

N=number of conductor turns;

$R_{B-}$=inner radius of B-coil (or toroidal field coil) in center post region;

$R_{B+}$=outer radius of B coil (or toroidal field coil) in center post region;

T=temperature;

$\overline{R}$=dimensionless conductive tube radius;

$\overline{α}$=thermal diffusivity=Ú $C_p$;

$C_p$=thermal heat capacity;

$T_o$=initial temperature;

$T_1$=final temperature.

Description of the Preferred Embodiments

The following description is of the best mode presently contemplated for carrying out the invention. This description is not to be taken in a limiting sense, but is made merely for the purpose of describing the general principles of the invention. The scope of the invention should be determined with reference to the claims.

All of the embodiments described herein employ a conductive surface for use in a centerpost region of, for example, a tokamak fusion reactor (TFR). Numerous uses for this conductive surface are contemplated and thus applications beyond TFR applications should be understood to be covered by the claims.

The conductive surface can be, for example, composed of a single conductive tube, multiple concentric conductive tubes or a rolled or spiraled sheet. The conductive surface conducts both a toroidal field current $I_z$ (or relatively constant (axial) current $I_z$) and an ohmic heating current $I_φ$ (or time-varying (toroidal) current $I_φ$), for generating a toroidal magnetic field $B_φ$ and a toroidal electric field $E_φ$, respectively. Note that the terms relatively constant (axial) current $I_z$, and time-varying (toroidal) current $I_φ$ are in reference to how such currents typically function in a TFR. In other embodiments, the axial current $I_z$ may be time varying, and the toriodal current $I_φ$ may be constant. The terms "constant" and "time-varying" are used herein merely to avoid possible confusion caused by referring to the currents by their geometry (because, e.g., their related magnetic fields do not have similar geometries, but rather have geometries in accordance with the right-hand rule—a magnetic field related to one of the currents may have a geometry more similar to the geometry of the other current).

Using a conductive surface to conduct both the constant current $I_z$ and the time-varying current $I_φ$ current results in a larger current carrying capacity that has heretofore been achievable for a given core diameter (i.e., a given radial extent of the centerpost region) and thus allows for higher magnetic field strengths for driving, e.g., a plasma current $I_p$. Among other advantages, this larger current carrying capacity allows greater plasma containment forces to be generated than have been heretofore achievable for a given core diameter.

Referring to FIGS. 7 through 9, description is provided herein that applies generally to the embodiments and variations thereof described hereinbelow.

Figure 5:
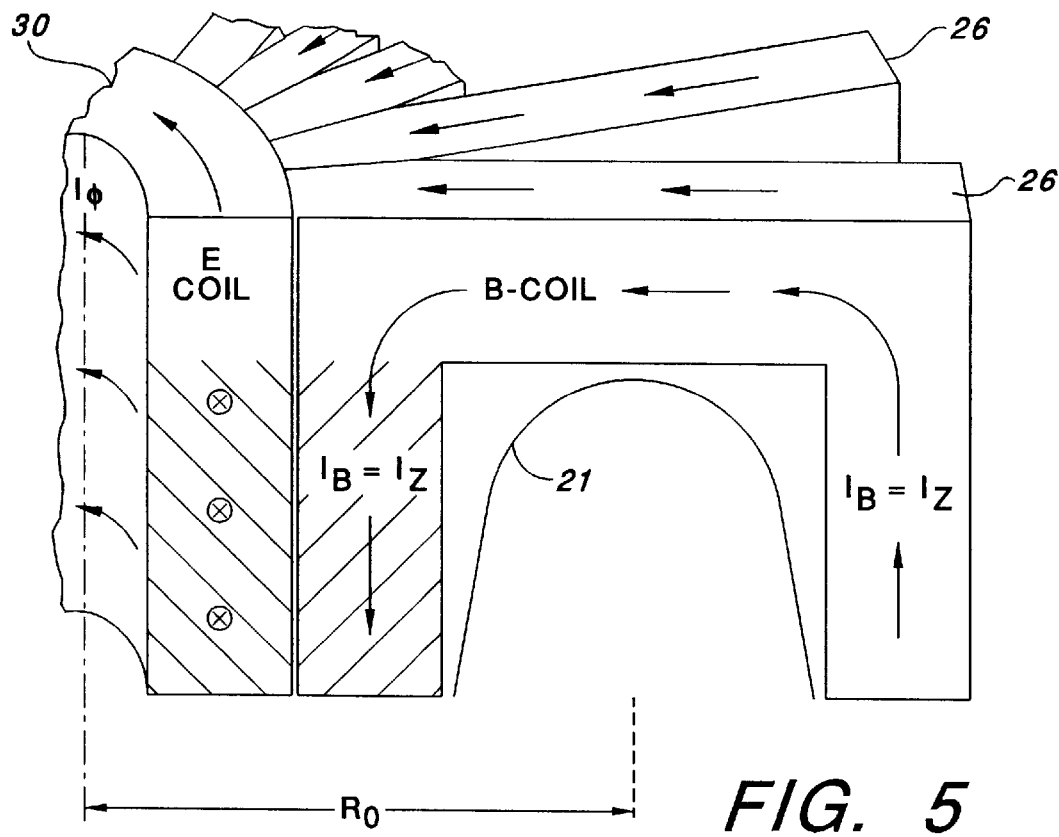
FIG. 5 is a perspective view, partially in cross-section, of currents in a B-coil and an E-coil of a TFR in accordance with the prior art.
Figure 6:
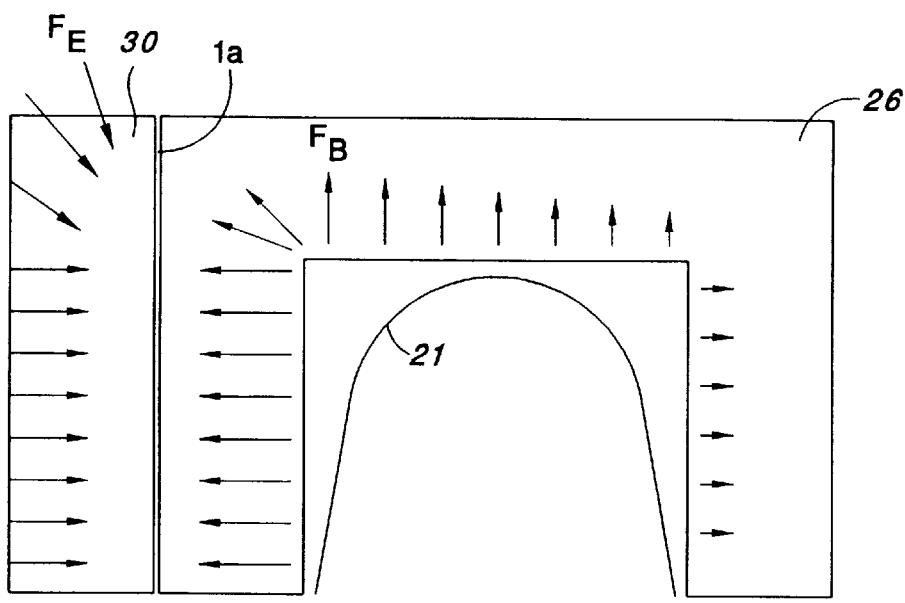
FIG. 6 is a schematic diagram showing the direction of forces produced by the currents in the B-coil and the E-coil of FIG. 5.

Referring to FIG. 7, an embodiment is shown of a centerpost region in which combined current flows made up of the relatively constant current $I_z$ and the time-varying current $I_φ$. Both the constant current $I_z$ and the time-varying current $I_φ$ are induced to flow along a generally cylindrical conductive surface 101, 102, 103, 104, 105. The cylindrical conductive surface 101, 102, 103, 104, 105 can be configured, for example, to reside in the centerpost region of the TFR and to replace, in the centerpost region, both the B-coil 26 (FIG. 5) and the E-coil 28 (FIG. 5) used in prior art approaches.

By way of example, during a fusion reaction, the constant current $I_z$ is held constant, and is thus referred to herein as the constant current $I_z$, while the time-varying current $I_φ$ is continuously varied to induce a toroidal electric field $E_φ$ to drive and sustain a toroidal plasma current $I_p$ within a high-temperature plasma, and is thus referred to herein as the time-varying current $I_φ$.

The fusion reaction is substantially maintained during the time between an initial start time $T_1$ and an end time $T_5$. The cylindrical surface 101, 102, 103, 104, 105 is depicted, respectively, in FIG. 7, at five points in time, $T_1$, $T_2$, $T_3$, $T_4$, $T_5$.

Referring next to FIG. 8, a graph is shown of the constant current $I_z$ and the time-varying current $I_φ$ flowing through the cylindrical surface 101, 102, 103, 104, 105 of FIG. 7 versus time. At a start time $T_1$, the constant current $I_z$ and the time-varying current $I_φ$, each of which flows in a direction that is orthogonal to the other, flow on the conductive surface 101, 102, 103, 104, 105 (FIG. 7). Their combination, i.e., a combined current, forms a spiral path along the cylindrical surface 101, 102, 103, 104, 105. Over time, the time-varying varying current $I_φ$ decreases causing the pitch of the combined current's spiraling path to decrease, i.e, to become closer to parallel to a major axis of the cylindrical surface 101, 102, 103, 104, 105, such as at time $T_2$, until, at time $T_3$, the time-varying current $I_φ$ crosses zero. Thus, at time $T_3$, only the constant current $I_z$ is flowing in the cylindrical surface 101, 102, 103, 104, 105. As a result, at time $T_3$, only the toroidal magnetic field $B_φ$ is maintained.

The poloidal magnetic field $B_\theta$ (also referred to as an axial magnetic field $B_z$ because its flux lines are substantially parallel to a major center axis of the centerpost region, in the centerpost region) is zero.

As time progresses to time $T_4$, the time-varying current $I_\phi$ becomes negative, causing the combined current to again follow a spiral path down the cylindrical surface 101, 102, 103, 104, 105, with an increasing pitch equal and opposite to the pitch at time $T_2$.

At time $T_5$, the pitch of the spiral path is equal and opposite to the pitch at time $T_1$.

Variation in the time-varying current $I_\phi$ current, and thus in the combined current's direction of flow may be effected by an external power supply or by internal properties of the cylindrical surface 101, 102, 103, 104, 105. Both of these approaches are discussed hereinbelow.

Referring to FIG. 9, a graph is shown of compressive stress (hoop stress) induced by the constant current $I_z$ and the time-varying current $I_\phi$ through the cylindrical surface 101, 102, 103, 104, 105 between time $T_1$ and time $T_5$. The maximum hoop stress occurs at time $T_3$ when only the constant current $I_z$ is flowing through the cylindrical surface 103.

Referring to FIGS. 10 through 22, various figures are provided relating to a rolled conductive sheet embodiment of the present invention, including figures depicting one example of a power supply configuration for generating an controlling the constant current $I_z$ and the time-varying current $I_\phi$ in the centerpost region.

In principle this embodiment employs a long thin conductive sheet (which may be normally conductive, e.g., copper, or superconductive) having slits or cuts along its long edges to form cut outer legs. One or both sides of the conductive sheet are preferably insulated electrically. The conductive sheet is rolled to form a cylinder and the cut outer legs from one end of the cylinder are bent outward to meet corresponding legs from another end of the cylinder, forming a toroidal region around the cylinder and inside the cut outer legs. The cut outer legs are connected to external power supplies that control the voltage applied to each cut outer leg. Such configuration allows control of the orthogonal, axial, and toroidal electric fields in the conductive sheet in a centerpost region. The electric field in the conductive sheet causes electric currents to flow, which are both axial and toroidal in direction. The external power supplies can, by controlling these electric fields, control overall current direction and magnitude. The currents in turn produce orthogonal magnetic fields (axial and toroidal) that can be used in a device for magnetic coupling (by way of example, in a transformer configuration) or for magnetic field generation (by way of further example, for plasma confinement in a tokamak fusion reactor).

Referring to FIG. 10, a plan view is shown of a conductive sheet 1000 having cut outer legs 1002 along its edges, a centerpost region 1004 therebetween, and an insulated surface 1006 for constructing a magnetic field coil, in accordance with one embodiment of the present invention.

In FIG. 11 a perspective view is shown of the conductive sheet 1000 of FIG. 10 having been rolled with its cut outer legs 1002 aligned. Note that while preferred, alignment of the cut outer legs is not required. And in FIG. 12, a cross-sectional elevation view is shown of a magnetic field coil (also referred to herein as a spiraled or coiled magnetic field coil) formed from the conductive sheet 1000 of FIG. 10 with corresponding pairs of cut outer legs 1002 at each of its ends bent to form loops 1200 of a toroidal field coil that allow connection to a power supply at a mid-plane joint 1202.

In the embodiment of FIGS. 10, 11 and 12, a continuous thin sheet 1000 of conducting material is used to form the magnetic field coils in the centerpost region, as opposed to the use of two separate coils in the prior art (FIGS. 1 through 6).

In one variation, current direction is controlled using external power supplies as shown schematically in FIGS. 20 through 22, as described below. In another variation, a resistive spiral section (either with a resistive strip or a thermally-induced) is formed at the centerpost region to control the current directions through the centerpost region. In these variations, above and below the centerpost region, the cut outer legs are cut similar to those in the above-described embodiment.

Unlike on the conductive tubes in the embodiment described below, in which each of the cut outer legs of each conductive tube are the same width as the remaining cut outer legs on such conductive tube, the spacing between cuts along the edges of the conductive sheet 1000 is smaller on one end 1008 of the sheet than on the other end 1010, increasing from the one end to the other end as a function of position. This increasing spacing accounts for an increasing radius, and thus circumference, that results when the conductive sheet is rolled to form the coiled magnetic field coil. The cut outer legs 1002 are spaced so that the cut outer legs 1002 are aligned with one another, largely for structural reasons, when the conductive sheet is rolled into the coiled magnetic field coil.

Figure 20:
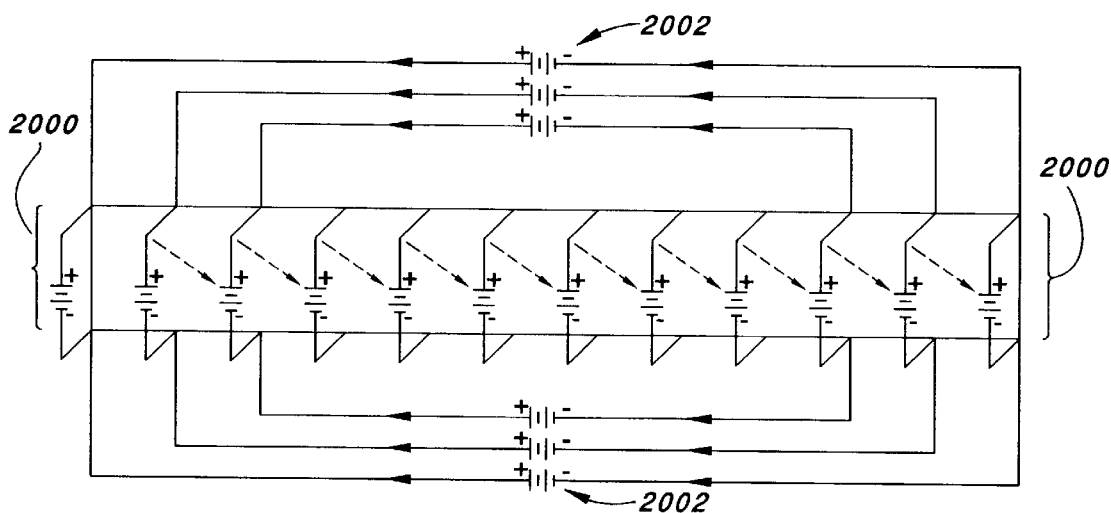
FIG. 20 is a schematic diagram showing a first (or B-coil) power supply and a second (or E coil) power supply, for generating the constant current $I_z$ and the time-varying current $I_\phi$ in the conductive sheets shown in FIGS. 10 through 15 that form the combined current flow shown in FIG. 18.
Figure 21:
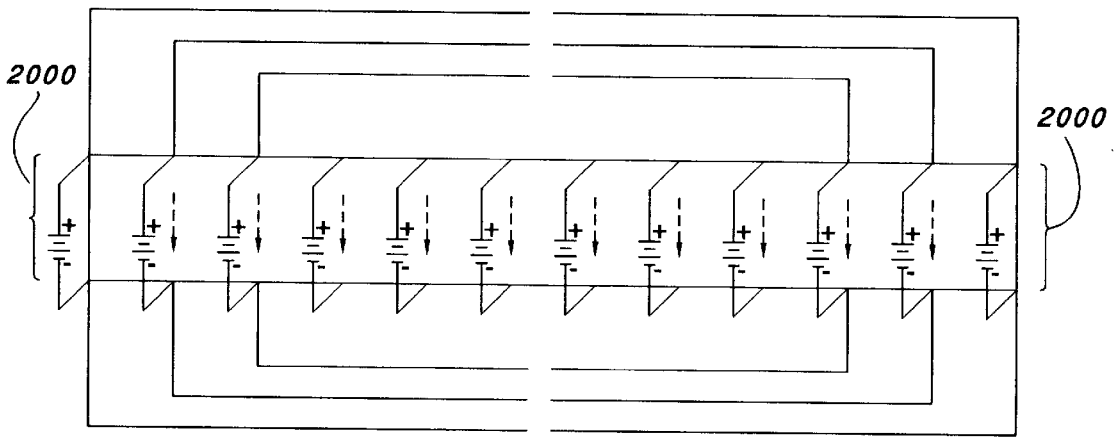
FIG. 21 is a schematic diagram showing the first power supply, for generating the constant current $I_z$ shown in FIG. 16.
Figure 22:
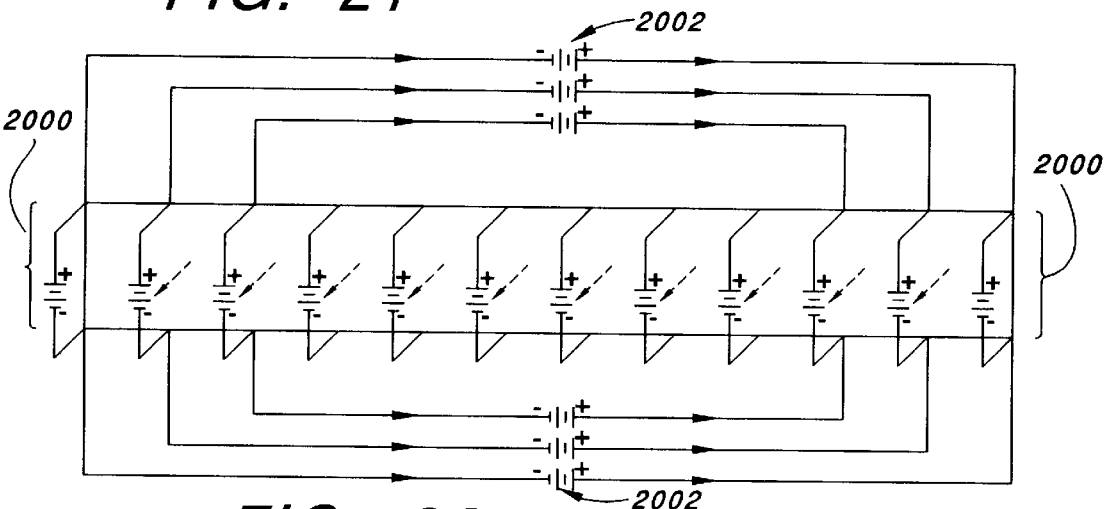
FIG. 22 is a schematic diagram showing configuration of the first power supply and the second power supply, for generating the constant current $I_z$ and the time-varying current $I_\phi$ in the conductive sheets shown in FIGS. 10 through 15, having reversed its direction of flow, that form the combined current flow shown in FIG. 19.

Once the conductive sheet 1000 has been rolled with the cut outer legs 1002 properly aligned, the cut outer legs 1002 are brought together at a mid-plane joint 1202 and connected to a power supply (not shown), e.g., an external power supply such as shown in FIGS. 20 through 22. A thin layer of insulation 1006 of the conductive sheet 1000 is between each adjacent layer of the coiled magnetic field coil.

Referring to FIG. 13, a plan view is shown of a variation of the conductive sheet 1300 of FIG. 10 having cut long outer legs 1302 along one edge, cut short outer legs 1303 along another edge, a centerpost region 1304 therein between, and an insulated surface 1306 for constructing a magnetic field coil, in accordance with a further embodiment of the present invention. In FIG. 14, a perspective view is shown of the conductive sheet 1300 of FIG. 13 having been rolled with its cut outer legs 1302, 1303 aligned. And in FIG. 15, a cross-sectional elevation view is shown of a magnetic field coil (also referred to herein as a spiraled or coiled magnetic field coil) formed from the conductive sheet 1300 of FIG. 14 with corresponding pairs of cut outer legs 1302, 1303 at each of its ends bent to form toroidal loops 1500 of the magnetic field coil connected to a current supply at a bottom joint 1502. In other respects this embodiment is similar to the embodiment shown in FIGS. 10 through 12.

Figure 16:
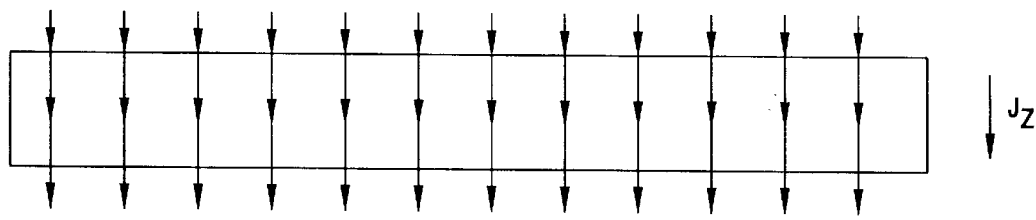
FIG. 16 is a schematic diagram of the constant axial current $I_z$ of FIGS. 7 and 8 as it flows through the centerpost region of the conductive sheet of FIGS. 10 through 15.
Figure 17:
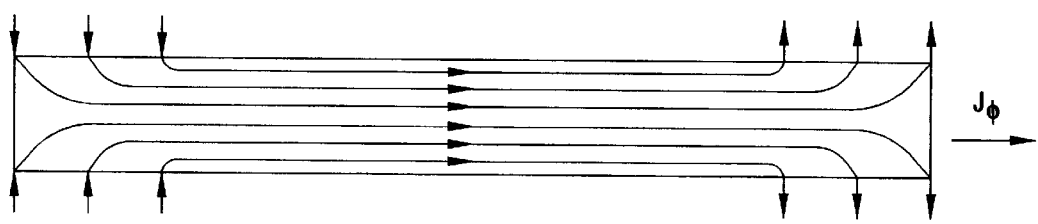
FIG. 17 is a schematic diagram of the time-varying toroidal current $I_\phi$ of FIGS. 7 and 8, as it flows through the centerpost region of the conductive sheet of FIGS. 10 through 15.

FIGS. 16 through 17 are schematic diagrams showing various current densities flowing in the centerpost region of the conductive sheets of FIGS. 10 through 15.

Through each corresponding pair of cut outer legs, separate power supplies (such as shown in FIGS. 20 through 22) generate an axial or constant electric field $E_z$ which drives axial current density $J_z$ between the cut outer legs. Other separate power supplies (also shown, by way of example, in FIGS. 20 through 22) generate a toroidal electric field $E_\phi$ which drives toroidal or time-varying current density $J_\phi$. The constant current density $J_z$ is depicted in FIG. 16 as it flows through the centerpost region of the coiled magnetic field coil (which has been uncoiled for purposed of illustration).

The time-varying current density $J_\phi$ is depicted in FIG. 17 as it flows through the centerpost region of the coiled magnetic field coil (which is depicted uncoiled) in a manner to produce toroidal current density in the centerpost region.

Figure 18:
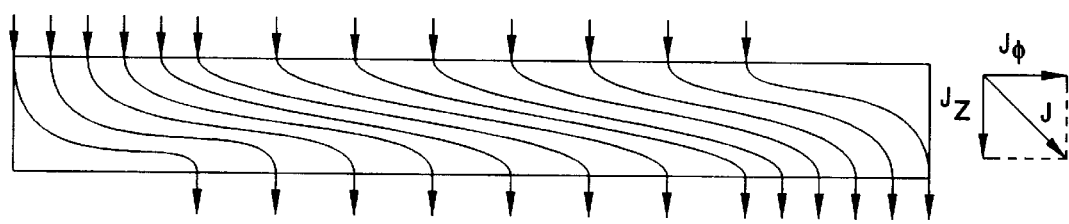
FIG. 18 is a schematic diagram of a superposition of the constant axial current $I_z$ of FIG. 16 and the time-varying toroidal current $I_\phi$ of FIG. 17 showing a combined current flow through the centerpost region of the conductive sheet of FIGS. 10 through 15.

With both the constant current density $J_z$ and the time-varying current density $J_\phi$ flowing, as is initially the case, the total current flowing through the centerpost region of the coiled magnetic field coil is approximately as depicted in FIG. 18.

In operation in accordance with one particular embodiment, with the constant current density $J_z$ remaining constant, the time-varying current density $J_\phi$ is reduced until the time-varying current density $J_\phi$ is zero. When the time-varying current density $J_\phi$ is zero, only the constant current density $J_z$ is flowing, and thus the total current is approximately as depicted in FIG. 16.

Figure 19:
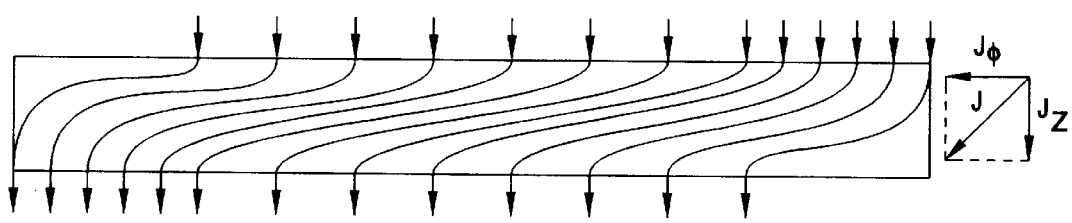
FIG. 19 is a schematic diagram of a superposition of the constant axial current $I_z$ of FIG. 16 and the time-varying toroidal current $I_\phi$ of FIG. 17, having reversed its direction of flow, showing another combined current flow through the centerpost region of the conductive sheet of FIGS. 10 through 15.

The polarity of the time-varying current $I_\phi$ is then reversed resulting in the approximate total current density flow as depicted in FIG. 19.

In one variation, the configurations shown above in FIGS. 10 through 15 require external power supplies configured such as shown in FIGS. 20 through 22 to generate current flow as shown in FIGS. 16 through 19.

Referring to FIG. 20, a schematic diagram is shown of a toroidal field power supply 2000 and an ohmic heating power supply 2002, for generating the axial electric field $E_z$ and the toroidal electric field $E_\phi$ that generates the combined current density flow shown in FIG. 18.

Referring to FIG. 21, a schematic diagram is shown of the toroidal field power supply 2000, for generating the constant current density $J_z$ shown in FIG. 16.

Referring to FIG. 22, a schematic diagram is shown of a configuration of the toroidal field power supply 2000 and the ohmic heating power supply 2000, for generating the axial or constant electric field $E_z$ and the toroidal or time-varying electric field $E_\phi$, having reversed its direction from that of FIG. 20, that form the combined current density flow pattern shown in FIG. 19.

Referring to FIGS. 23 through 41, various figures are provided of a conductive tube embodiment of the present invention. Numerous variations of such embodiment (which are also applicable to the rolled conductive sheet embodiment described above) are presented including, a resistive strip variation, and a thermally-induced resistive strip variation (or thermal strip variation), both of which may be implemented using normally conducting materials, superconductive materials, or a combination thereof.

In a resistive strip variation, many thin concentric conductive tubes (made from normally conducting material, e.g., copper, or superconductive material) are employed with ends cut to form cut outer legs. A region between the cut outer legs forms a centerpost region and contains a helical electrical resistive strip that changes in resistivity relative to a base material as a function of temperature.

One or both sides of the conductive tubes are electrically insulated so that the tubes are electrically insulated from one another. The cut outer legs from one end of the conductive tube are bent outwardly to meet cut outer legs from another end of an adjacent conductive tube, which are similarly bent, forming a toroidal region outside the centerpost region and inside the cut outer legs having been bent. This arrangement produces a multi-turn coil consisting of conductive cylinders connected electrically at their cut outer legs in series. An external power supply is connected between an unconnected cut outer leg from an inner most conductive tube and an unconnected cut outer leg from an outer most conductive tube. This arrangement can be used to produce an axial electric field in the centerpost regions of the concentric conductive tubes that drives current axially in the centerpost regions. The helical resistive strip causes the axial current to be redirected onto a spiral path.

If cryogenic temperatures are used, and the base material is pure copper, the resistive strip may be, for example, Beryllium (Be) doped copper, which is 10 to 50 times more resistive than pure copper at cryogenic temperatures. In this arrangement, the current is redirected from an axial flow into a helical path by the spiral resistive strip. As a result, a toroidal current component is introduced.

If the centerpost region is heated to room temperature, the resistivity of the Be doped copper is less than twice the resistivity of the pure copper. Under this circumstance, the current flows substantially axially, with only a slight toroidal component.

In this way, current direction in the centerpost region is controlled, i.e., varied from having a large toroidal component to having a very small or zero toroidal component such as shown in FIGS. 7 and 8 from times $T_1$ to $T_3$.

In a thermally-induced resistive strip variation (described beginning with FIG. 34), an arrangement similar to the resistive strip variation, described above, is used, except instead of the resistive strip, a thermal gradient within the base material is used to create a thermal-spiral strip of greater resistivity than the base material. A helical coolant channel (or heating element), for example, can be fabricated into the centerpost region of the conductive tube. Coolant in the coolant channel, or thermal energy from the heating element, causes the thermal gradient in the base material, which in turn produces a helical resistive barrier to the axial current flow, thus redirecting the axial current along a helical path, and creating a toroidal current component.

At uniform temperature, i.e., with coolant flow stopped, or the heating coil turned off, the centerpost region has a substantially uniform resistivity, resulting in substantially axial current flow, i.e., approximately zero toroidal component.

In this way, current flow is controlled in the centerpost region in accordance with the sequence shown in FIGS. 7 and 8 from times $T_1$ to $T_3$.

Either of the resistive strip and thermal-spiral strip embodiments can be produced using superconductive material as the base material. An increase in temperature along a helical path will produce a normally conducting helical strip in the superconducting base material, thus causing an axial current flow to follow a helical path, and thus to have a toroidal component. When the normally conducting helical strip is brought back to below the critical temperature for the base material, the normally conducting helical strip becomes superconducting, and substantially only axial current flow is observed.

Each of these variations is described in further detail below.

Referring to FIG. 23, a perspective view is shown of a conductive tube 2300 having a spiral resistive strip 2302 in its centerpost region 2304 and having cut outer legs 2306 at each of its ends, in accordance an embodiment of the present invention. The centerpost region 2304 is formed in the conductive tube 2300 as a cylindrical conductor region that is mechanically and electrically coupled to the cut outer legs.

Referring to FIG. 24, a cross-sectional side view is shown of the conductive tube 2300 of the embodiment of FIG. 23, with corresponding pairs of cut outer legs 2306 at each end of the conductive tube 2300 bent to form loops 2400 of a toroidal field coil. The cut outer legs are conveniently cut and bent to form a torus, as shown.

Referring to FIG. 25 a cross-sectional elevation view is shown of several concentrically aligned conductive tubes 2500, 2502, 2504, 2506, 2508, 2510, such as the conductive tube 2300 in FIGS. 23 and 24, that together form a magnetic field coil 2512, for carrying the constant current $I_z$ and the time-varying current $I_\phi$ that produce a toroidal magnetic field $B_\phi$ and a poloidal magnetic field $B_\theta$ or ($B_z$) in accordance with an embodiment of the present invention. An advantageous geometry is shown for the resistive spiral centerpost region variation in which conductive centerpost regions of tubes 2500, 2502, 2504, 2506, 2508, 2510 (or coaxial cylinders 2500, 2502, 2504, 2506, 2508) are connected in a series configuration by looping cut outer legs 2514, 2516, 2518, 2520, 2522, 2524, 2526, 2528, 2530, 2532, 2536.

In TFR applications, the looped cut outer legs encompass the toroidal vacuum vessel 21 (FIG. 1).

Between each adjacent concentric tube 2500, 2502, 2504, 2506, 2508, 2510, and respective looped cut outer legs 2514, 2516, 2518, 2520, 2522, 2524, 2526, 2528, 2530, 2532, 2534, 2536 is an electrical insulator 2538, 2540, 2542, 2546, 2548. A cut outer leg 2516 from, e.g., a lower end of one concentric tube 2510 is connected to a corresponding cut outer leg 2510 from an upper end of an adjacent concentric tube 2508. This configuration is repeated for each concentric tube 2500, 2502, 2504, 2506, 2508, 2510 to effectively form a multiple-turn coil 2512. Current is supplied at an unconnected cut outer leg 2514 at an upper end of the outermost conductive tube 2500, which serves as a first current supply terminal. (By "unconnected" it is meant that such cut outer leg 2514 is not connected to a cut outer leg from, e.g., a lower end of an adjacent concentric tube 2502). In operation, the current follows in a conductive path from the unconnected outer leg 2514 through successive layers of the conductive tubes 2500, 2502, 2504, 2506, 2508, 2510 until it reaches an unconnected inner leg 2536 at the centermost conductive tube 2510. (By "unconnected" it is meant that such outer leg 2536 is not connected to an outer leg from, e.g., an upper end of the adjacent concentric tube 2508). The unconnected outer leg 2536 at the centermost conductive tube 2510 serves as a second current supply terminal.

The cylinders may be configured to allow for coolant channels and to allow for the grading of conductive areas to maintain a constant cross sectional area for current flow.

The magnetic coil 114 of the present embodiment is superior to existing wedged toroidal field coils used, for example, in TFR's because the present embodiment uses the conductive tubes 2500, 2502, 2504, 2506, 2508, 2510, which are axisymmetric (concentric) within their centerpost region 2304 and cut outer legs 2514, 2516, 2518, 2520, 2522, 2524, 2526, 2528, 2530, 2532, 2534, 2436 to form a torus outside the centerpost regions. In contrast, conventional wedged toroidal field coils are segmented in a toroidal direction, i.e., employ alternating wedges of insulation and conductor. Since, in any case, each turn must be insulated, the present approach offers a significant advantage in that (by employing axisymmetric "turns") insulation is placed between conductive tubes 2500, 2502, 2504, 2506, 2508, 2510 and in this direction of low stress (i.e., the radial direction). In contrast, in conventional wedged toriodal field coils, the wedges of insulation are placed across the high stress region, bearing the brunt of the toroidal compressive stress (hoop stress). Thus, the wedge formation used in the wedged toroidal field coils of existing TFR's is not generally the most desirable mechanical or thermal geometry, but it is used because multiple toroidal field turns are needed to form the TFR's toroidal geometry. Use of conductive tubes 2500, 2502, 2504, 2506, 2508, 2510 in the present embodiment allows for multiple toroidal field turns without requiring the insulation layers to bear the toroidal compressive stress (hoop stress).

The present embodiment is also advantageous because the conductive tubes 2500, 2502, 2504, 2506, 2508, 2510 can be made of multiple thin sheets of material (formed into the conductive tubes 2500, 2502, 2504, 2506, 2508, 2510), which are generally of higher strength than a similar amount of the same material in a thicker form. Furthermore, grading of the conductive tubes 2500, 2502, 2504, 2506, 2508, 2510 in a radial direction is natural in the present configuration by varying the thickness of adjacent tubes in order to assure consistent conductor cross-section throughout the device. And, the material properties of each conductive tube 2500, 2502, 2504, 2506, 2508, 2510 can be tailored in accordance with stresses and thermal requirements, both of which can vary as a function of the conductive tubes' radii.

A superconducting coil variation of the present embodiment may be employed in which a normally conducting material, e.g., Copper, of the conductive tubes 2500, 2502, 2504, 2506, 2508, 2510 is replaced by superconductive material, e.g., Niobium-Tin, as described hereinbelow. This superconducting material can be made to change the direction of total current flow in the centerpost region 2304 similar manners to those in which the approaches described herein employing normally conducting material change the direction of total current flow. Thus the features of the present embodiment work equally well for normally conducting materials and for superconducting materials, are easily scalable so as to accommodate various sizes of TFR's, and for other applications to which the present embodiment can be put.

Another advantage of the present embodiment is that electrical connections are made in the outside areas of the device where relatively low mechanical stresses are present, as compared to, for example, the centerpost region 2304.

Also, in TFR applications, the field coils can be made demountable, whereas conventional wedged toroidal field coils are constructed as a closed torus around the vacuum vessel. Advantageously, the present embodiment allows the vacuum vessel to be placed over the centerpost region before the cut outer legs 2514, 2518, 2522, 2526, 2530 are bent outward over the vacuum vessel and connected to respective other cut outer legs 2516, 2520, 2524, 2528, 2532, 2536 at their outer extremes. This assembly approach vastly improves over conventional wedged toroidal field coils used with TFR's in which elaborate and less reliable joints must be fabricated to allow insertion of the vacuum vessel.

Additionally, the present embodiment advantageously provides insulator design flexibility because the insulators 2538, 2540, 2542, 2544, 2546, 2548 are aligned in a direction of minimum stress, i.e., the radial direction, and because the stress on the insulators may be significantly reduced by configuring the conductive tubes 2500, 2502, 2504, 2506, 2508, 2510 with sufficient hoop strength to reduce or eliminate the radial stresses that are present on the electrical insulators 2538, 2540, 2542, 2544, 2546, 2548.

In addition, the insulators 2538, 2540, 2542, 2544, 2546, 2548 in the present approach encounter no edges in the centerpost region 2304 that inherently result in large electric field density, and create a risk of electrical breakdown in the insulators.

The present embodiment also allows coolant channels to be placed on the outside of mating tubes during fabrication of the conductive tubes 2500, 2502, 2504, 2506, 2508, 2510. Joining of two mating tubes can produce a water tight coolant channel.

Figure 26:
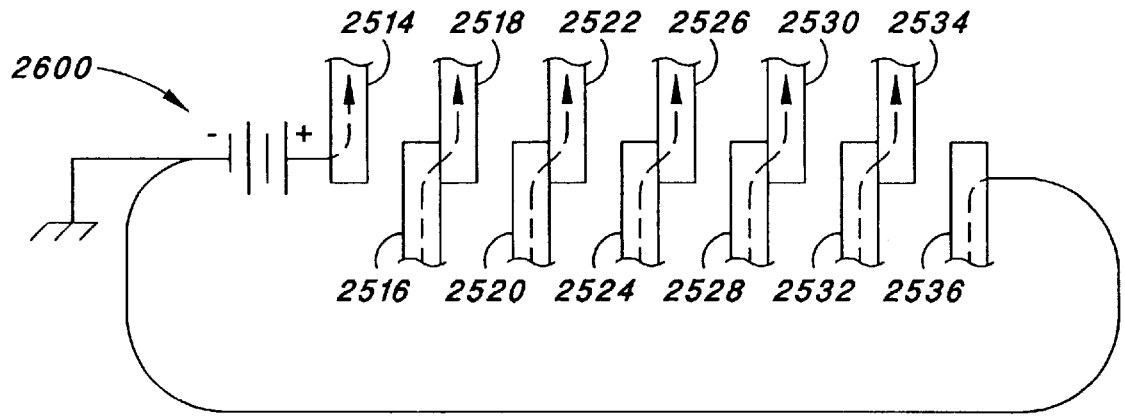
FIG. 26 is a schematic view of an approach for use in coupling together the cut outer legs of the conductive tubes of FIG. 25.

Referring to FIG. 26, a schematic view is shown of an approach for use in coupling together the cut outer legs 2514, 2516, 2518, 2520, 2522, 2524, 2526, 2528, 2530, 2532, 2534, 2536 of the conductive tubes 2500, 2502, 2504, 2506, 2508, 2510 of FIG. 25. Cut outer legs 2516, 2520, 2524, 2528, 2532 from the lower portion of the conductive tubes 2500, 2502, 2504, 2506, 2508, 2510 are mechanically and electrically connected to cut outer legs from 2518, 2522, 2526, 2530, 2534, 2536, the upper allowing current (depicted with a dashed line) to flow through adjacent conductive tubes placing each tube in series with remaining tubes. The inside and outside cut outer legs 2514, 2536 not connected to cut outer legs from adjacent conductive tubes but are connected to a power supply 2600.

Figure 27:
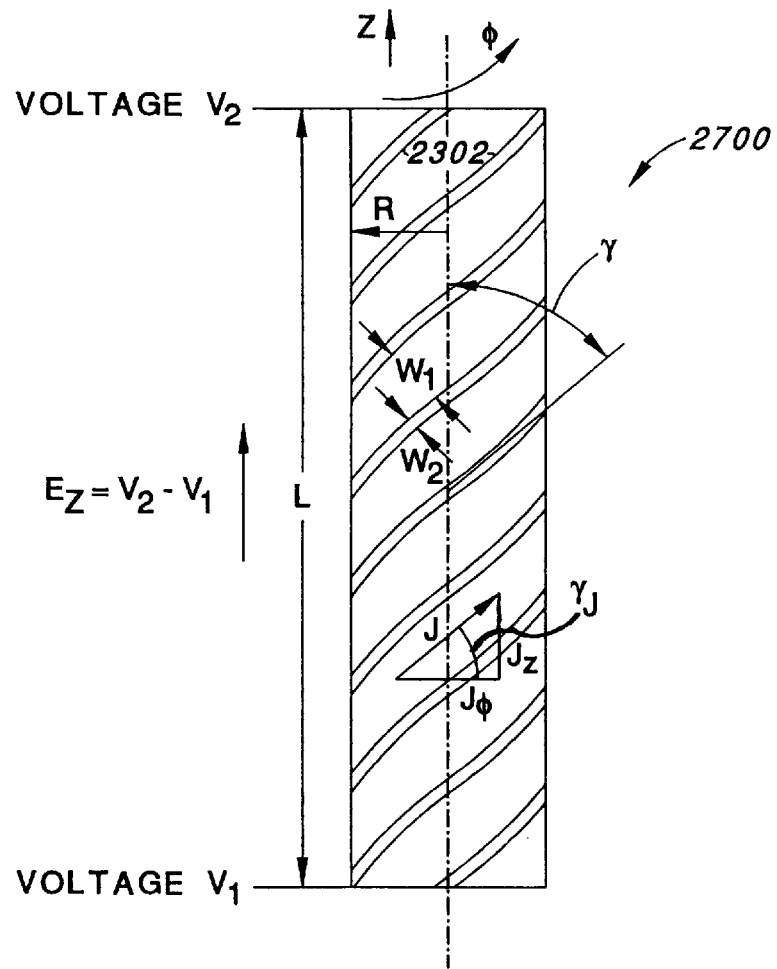
FIG. 27 is a schematic diagram of the resistive spiral centerpost region of the conductive tube of FIG. 23 showing the geometry of a resistive spiral and a conductive spiral in the centerpost region.

Referring to FIG. 27, a schematic diagram is shown of the resistive spiral centerpost region 2700 of the embodiment of the conductive tube 2300 of FIG. 23. The operation of the resistive spiral centerpost region in the conductive tube embodiment is described. Shown is a pair of spiral resistive strips 2302, pure copper regions interposed between the two resistive spiral strips, a resistive spiral strip pitch angle y, and a current density pith angle $\gamma_J$. Also shown is a lower voltage $V_1$, an upper voltage $V_2$, a length L, a radius R, and a major axis Z. These parameters are used in modeling currents though the resistive spiral centerpost region.

An axial electric field $E_z$ is produced by external means, with it's magnitude given by $$[(V_2-V_1)/L]=E_z$$

(Note that use of the cut outer legs described above is not essential to the workings of the centerpost region 2700, but rather merely serve, in a basic embodiment, as a series current path. It is contemplated that any appropriate current path can be used in combination with the described centerpost region in order to achieve the current control features described herein, i.e., in order to control the direction of current flow in the centerpost region.)

Figure 28:
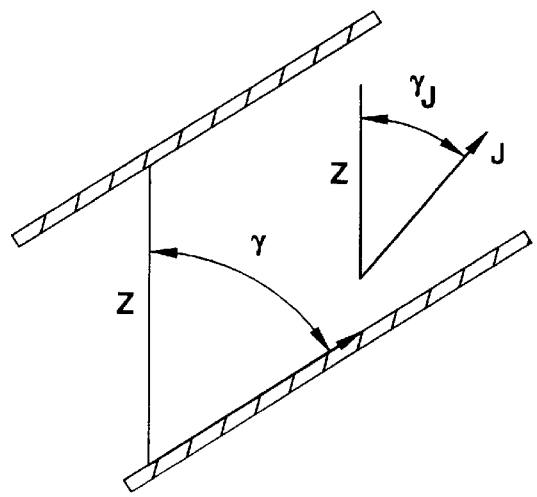
FIG. 28 is a schematic diagram of current density pitch relative to physical pitch of the spiral, the resistive spiral in the centerpost region of the conductive tube of FIG. 27.

FIG. 28 (along with FIG. 27) is a schematic diagram of current density pitch angle $\gamma_J$ relative to physical resistive spiral strip pitch angle $\gamma$ of spiral resistive strip(s) 2302 on the centerpost region of the conductive tube of FIG. 23. The spiral resistive strips 2302 can be used to control the current density pitch angle $\gamma_J$, allowing for variation of the time-varying current $I_\phi$ (described above), while maintaining the constant current $I_z$, a thrust allowing for variation in total current density J. $\gamma$ and $\gamma_J$ can be related to the local material thicknesses of the conductive region and the resistive region.

Figure 29:
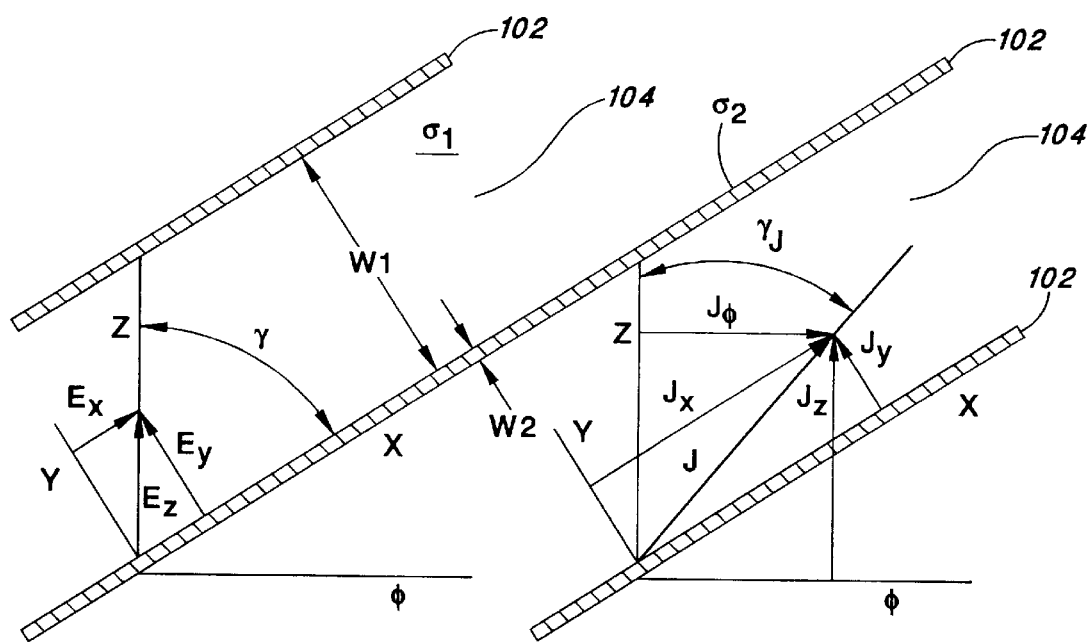
FIG. 29 is a schematic diagram showing a resistive spiral in the centerpost region of the conductive tube of FIGS. 23 through 25 with graphical definitions of parameters used in analyzing current flow through the conductive tube.

Referring to FIG. 29, a schematic diagram is shown of a spiral wound resistive layer in the conductive tube of FIG. 23 with graphical definitions of parameters used in analyzing current flow through the conductive tube. x and y are orthogonal Cartesian coordinate axis in a plane parallel and perpendicular to the local resistive strip. The conductive region 1 has width $W_1$ and conductivity $\sigma_1$. The resistive strip region 2 has width $W_2$ and conductivity $\sigma_2$. Local electric field $E_x$ and $E_y$ and current density $J_x$ and $J_y$ are shown and related to their respective components in a Z-$\phi$ plane.

The geometry and parameters shown in FIGS. 27 through 29 are used below to define the current switching capability of the spiral resistive strip.

To study the magnetic fields generated by the currents flowing through the centerpost region of a conductive tube, initially, assume that the pitch of the spiral conductive path cannot be changed, i.e., the pitch of the conductive region between resistive spirals. Further assume that a constant difference in electrical potential (i.e., voltage) is applied between the bottom of the centerpost region of the conductive tube and the top of the centerpost region, which drives current, preferably in an axial direction.

The spiral resistive strips causes the current to flow in a helical (spiral) path due to the resistance (lack of conductivity) in the spiral resistive strips. In this configuration, geometrical pitch $\beta$ and physical pitch angle y are related by the formula $\beta=\tan \gamma$. The spiral resistive strips, however, are not pure insulators and, as shown in FIG. 28, the current density pitch angle $\gamma_1$ is less than the geometrical pitch angle $\gamma$ because some current "leaks" through the spiral resistive strips. Thus, the current density pitch $\beta_J$ is related to the current density pitch angle $\gamma_J$ by the formula: $\beta_J=\tan \gamma_J=J_\phi/J_z$; where $J_\phi$ and $J_z$ are the current densities in the toroidal and axial directions, respectively. The local (total) current density J in the centerpost region is given by the following formula:

$$J=J_z(1+\beta_J^2)^{1/2}.$$

Because of the current that leaks through the spiral resistive strips, the current density pitch $\beta_J$ is less than the geometrical pitch $\beta$ of the spiral resistive strips. The current density pitch $\beta_J$ is related to (1) a spiral resistive strip to conductive region width ratio $W_2/W_1$, where $W_1$ is the width of the conductive regions, and $W_2$ is the width of the spiral resistive strips; (2) a material conductivity ratio $\rho_2/\sigma_1$ between the conductive regions, e.g., pure copper, and the resistive region, where $\sigma_1$ is conductance in the conductive region, and $\sigma_2$ is conductance in the resistive regions; and (3) the geometrical pitch $\beta$.

Thus, the current density pitch $\beta_J$ is represented by the formula: $\beta_J=J_\phi/J_z=\tan \gamma_J=\beta G$; where $G=G$ ($\beta$; $W_2/W_1$; $\sigma_2/\sigma_1$)$\leq 1$. For a thin conductive tube, and neglecting the effects of current entry at the ends of the conductive tube, the dimensionless parameter G can be expressed as:

$$G=\left[\frac{\left(\frac{W_2}{W_1}+\frac{\sigma_2}{\sigma_1}\right)\left(\frac{W_2}{W_1}+\frac{\sigma_1}{\sigma_2}\right)-\left(1-\frac{W_2}{W_1}\right)^2}{\left(\frac{W_2}{W_1}+\frac{\sigma_2}{\sigma_1}\right)\left(\frac{W_2}{W_1}+\frac{\sigma_1}{\sigma_2}\right)+\left(1+\frac{W_2}{W_1}\right)^2\beta^2}\right]$$

The expression for the current density pitch angle has a maximum value of:

$$\beta_{Jmax}=\frac{\left(\frac{W_2}{W_1}\right)\left(\frac{\sigma_1}{\sigma_2}\right)\left(\frac{\sigma_2}{\sigma_1}-1\right)^2}{\left(\frac{W_2}{W_1}+1\right)\sqrt{\left(\frac{W_2}{W_1}+\frac{\sigma_2}{\sigma_1}\right)\left(\frac{W_2}{W_1}+\frac{\sigma_1}{\sigma_2}\right)}}$$

The geometrical pitch at this maximum current pitch angle $\beta_{Jmax}$ is defined as:

$$\beta_{max}=\frac{\sqrt{\left(\frac{W_2}{W_1}+\frac{\sigma_2}{\sigma_1}\right)\left(\frac{W_2}{W_1}+\frac{\sigma_1}{\sigma_2}\right)}}{\left(\frac{W_2}{W_1}+1\right)}$$

Figure 30:
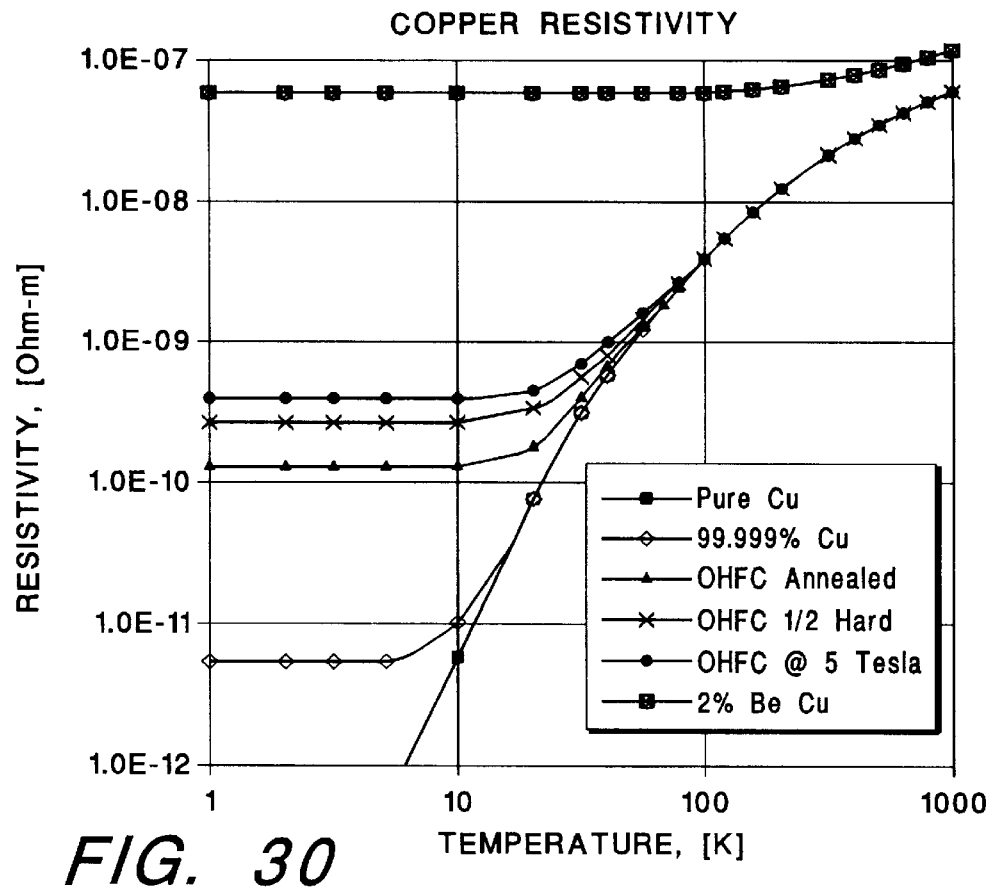
FIG. 30 is a graph of resistivity versus temperature for copper of differing purities and dopings, such as may be used in the conductive tube of FIGS. 23 through 25.

Referring to FIG. 30, a graph is shown of resistivity versus temperature for copper of differing purities and dopings, such as may be used in the conductive tube of FIGS. 23 and 24. The resistive spiral centerpost region of the conductive tube of FIGS. 23 and 24 is formed by a relatively high resistance spiral resistive strip 2302 around the centerpost region of the conductive tube. The resistive spiral centerpost region is produced by forming a thin spiral strip having a relatively high resistivity, which in some variations includes a base material of high purity copper or a similar high-conductivity material. The spiral resistive strip can be formed by adding an impurity to the base material during fabrication, ion implantation of impurities, or residual stress introduced during fabrication. The embodiment of FIGS. 23 and 24 takes advantage of the fact that, at cryogenic temperatures, copper with even a small amount of an impurity or residual strain has a much higher electrical resistivity than pure copper. The resistivity of copper with various levels of impurities is shown in FIG. 30.

Figure 31:
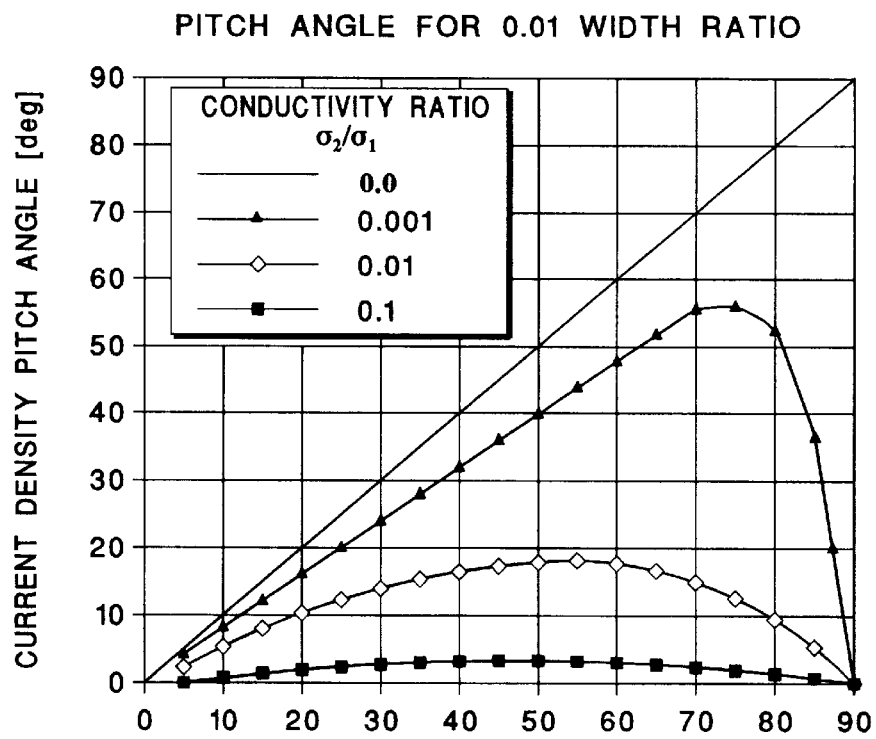
FIG. 31 is a graph of variation in current density pitch angle versus resistive strip pitch angle, at a resistive strip width to conductive strip width ratio of 0.01, for a number of different material conductivity ratios ($\sigma_1/\sigma_2$), useful in analyzing current flow through a variation of the conductive tube of FIGS. 23 through 25.
Figure 32:
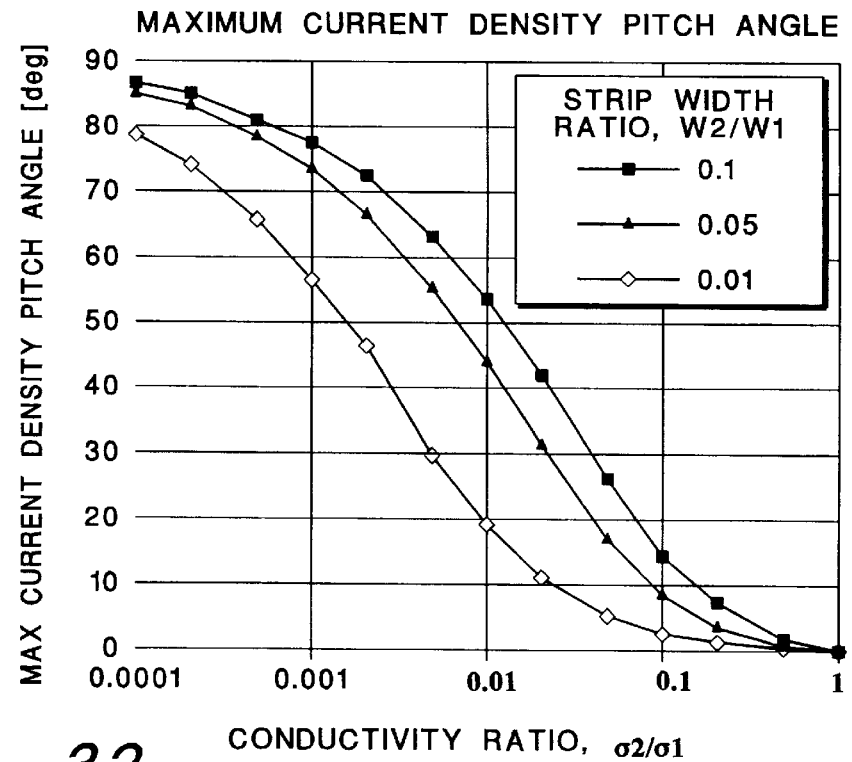
FIG. 32 is a graph of maximum current density pitch angle versus material conductivity ratio for different strip thickness ratios, useful in analyzing current flow through a variation of the conductive tube of FIGS. 23 through 25.
Figure 35:
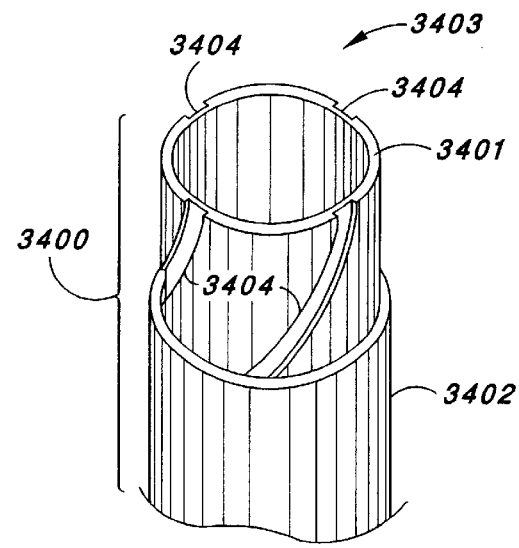
FIG. 35 is a perspective view of a partially assembled centerpost region of the conductive tube of FIG. 34 incorporating channels within the conductive tube for use in heating or cooling.

Referring to FIG. 31, a graph is shown of variation in current density pitch angle versus resistive strip pitch angle, at a resistive region width to conductive region width ratio ($W_2/W_1$) of 0.01, for a number of different material conductivity ratios $\sigma_2/\sigma_1$, useful in analyzing current flow through a variation of the conductive tube of FIGS. 23 and 24. Peaks in different conductivity ratio curves of FIG. 35 represent optimal geometrical pitch angles for given spiral resistive strip to conductive region ratios $\sigma_2/\sigma_1$. Even for a relatively low strip-thickness ratio of, for example, 0.01, relatively high current density pitch angle is achieved by using a relatively high conductivity ratio. (At an infinite conductivity ratio, i.e., zero conductivity in the resistive strips, or zero resistance in the pure copper portions of the centerpost region as is the case for a superconductor, the current density pitch angle is the same as the physical pitch of the strip.) Referring to FIG. 32, a graph is shown of maximum current density pitch angle versus conductivity ratio $\sigma_2/\sigma_1$ for different spiral resistive strip to conductive region width ratios $W_2/W_1$, useful in analyzing current flow through a variation of the conductive tube of FIGS. 23 and 24. For the centerpost region of a magnetic field coil used, e.g., in a TFR, the geometrical pitch angle is selected to maximize the current density pitch angle after selecting the thickness ratio and the conductivity ratio.

The following is a description of the major design parameters and a comparison of the use of the invention when compared to prior art in a TFR.

The toroidal magnetic field $B_\phi$ at a plasma center radius $R_o$ is: $B_{\phi o}=\mu_o J_z[R_+^2-R_-^2]/2R_o$; where $R_-$ and $R_+$ are the inner radius of the centerpost and the outer radius of the centerpost, respectively. The poloidal magnetic flux $\Phi_z$ is: $\Phi_z=2 \pi B_{\phi o}\beta_J[R_+^3-R_-^3]/3[R_+^2-R_-^2]$.

The Ampere-turn ratio (NI) for a conductive tube of length L and radius R is: $\beta_J=NI_\phi/NI_z=\beta_J L/2 \pi R$.

Use the above formula, the current density pitch angle variation can be calculated when the conductive tube of FIGS. 23 and 24 has spiral resistive strips as shown in FIG. 27, and when the conductive tube is operated between two different temperatures.

Figure 33:
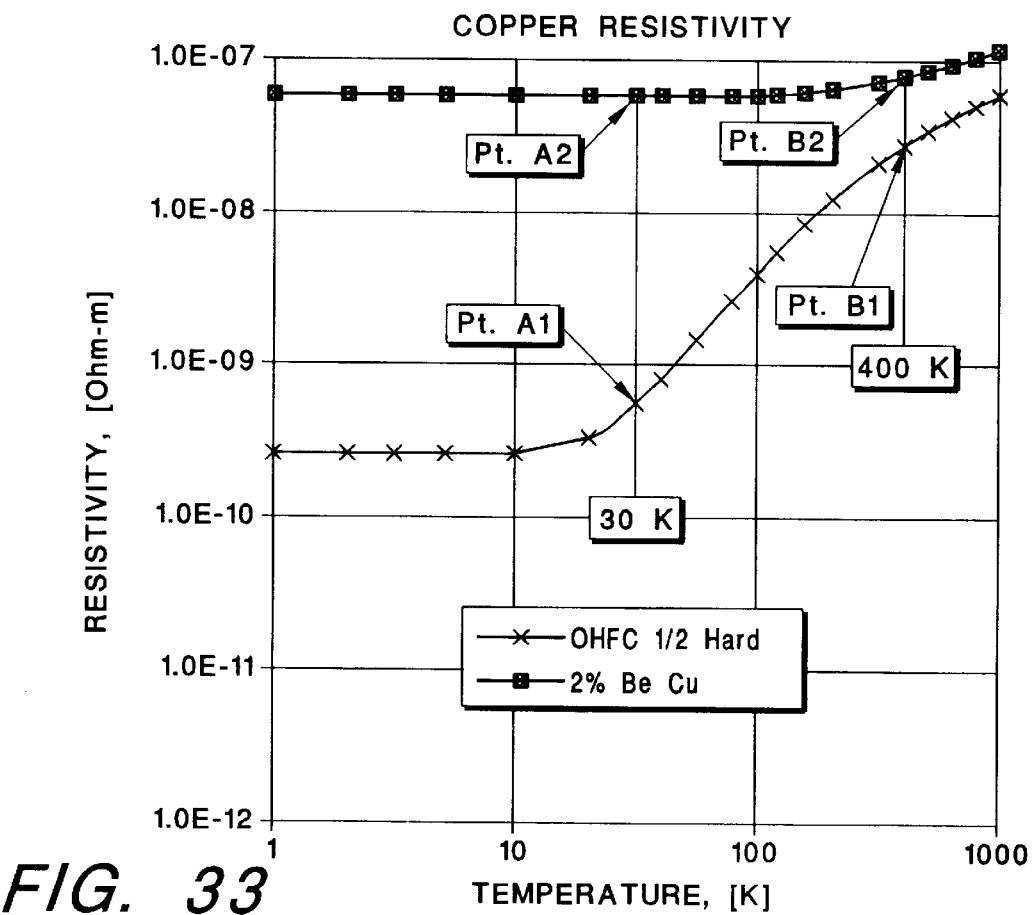
FIG. 33 is a graph of conductivity versus temperature for an impurity controlled (Be doped) resistive strip showing different operating points of a variation of the conductive tube of FIGS. 23 and 24.

Referring to FIG. 33, a graph is shown of conductivity versus temperature for an impurity controlled (Beryllium (Be) doped) resistive strip showing different operating points of a variation of the conductive tube of FIGS. 25 and 26. To compare the performance of a heretofore known DIII-D TFR, such as shown in FIG. 1, with a TFR having a magnetic field coil based on the embodiments described herein, the existing B-coil 26 (FIG. 1) and E-coil 28 (FIG. 1) are replaced with the magnetic field coil of the present embodiment. The cylindrical surfaces are formed using ½ hard OHFC copper (material 1) with a Beryllium (Be) spiral strip (material 2) of varying thickness ratio. FIG. 43 shows the resistivity at two operating points of the coil. The first point is cryogenic operation at 30 K as indicated by points A1 and A2 for materials 1 and 2, respectively. The second point is room temperature operation at 400 K, as indicated by points B1 and B2. The performance of this embodiment of the invention is compared with the performance of an existing B-coil/E-coil based on the generated toroidal field $B_{\phi o}$ a center radius $R_o$ of the plasma and a magnetic flux capability $\Delta\Phi_z$.

By way of example, for a heretofore known TFR such as the TFR produced by General Atomics of San Diego, and referred to as the DIII-D TFR, the center post coils have the following parameters:

$R_{B-}$ = 0.250 m; $R_{B+}$ = 0.620 m; (B-coil radius dimensions)

$R_{E-}$ = 0.658 m; $R_{E+}$ = 0.787 m; (E-coil radius dimensions)

$NI_B$ (amp-turns in B-coil) = 18.6

=>$B_{\phi o}$(plasma toroidal magnetic field) = 2.2T

@ $R_o$(plasma radius) = 1.69 m $\Delta\Phi_z$ ~ 10Vs (+/− current swing)

(E-coil flux swing capability).

A centerpost region using conductive tubes in accordance with one embodiment described herein has the following parameters:

$R_-$=0.250 m; $R_+$=0.787 m $J_z$=18.4 MA/m$^2$

NI=32.2MA $B_{\phi o}$=3.85 T @ $R_o$=1.69 m $\sigma_2/\sigma_1$=0.00875 @ T=30 K $\sigma_2/\sigma_1$=0.309 @ T=400 K Exemplary flux output comparison results for a magnetic field coil in accordance with one variation of the embodiments described herein based on the geometry of the DIII-D TFR are shown in Table 1below:

TABLE 1

| | |
|---|---|
| $W_2/W_1$ | 0.10 |
| $\gamma_{Jmax}$ | 72.7 |
| $\gamma_{Jmax}$ @ 30° K. | 55.4 |
| $\gamma_J$ @ 400° K. | 2.06 |
| $\Delta\beta_J$ | 1.41 |
| Flux: Invention | 16.3 $V_S$ |
| Flux: DIII-D | 10 $V_S$ (±$I_{swing}$) |

The flux output is shown to be 63% higher for the same toroidal field in both cases and shows the performance of the magnetic field coil of the present embodiments is superior to conventional B-coil/E-coil approaches. The present embodiments are even more advantageous for low aspect ratio (LAR) devices, which have no room for poloidal flux generation and in which any flux output from a centerpost coil is an improvement. (Aspect ratio is defined as a ratio of the plasma's major radius $R_0$ to its minor radius, a or AR=$R^0$/a).

Figure 34:
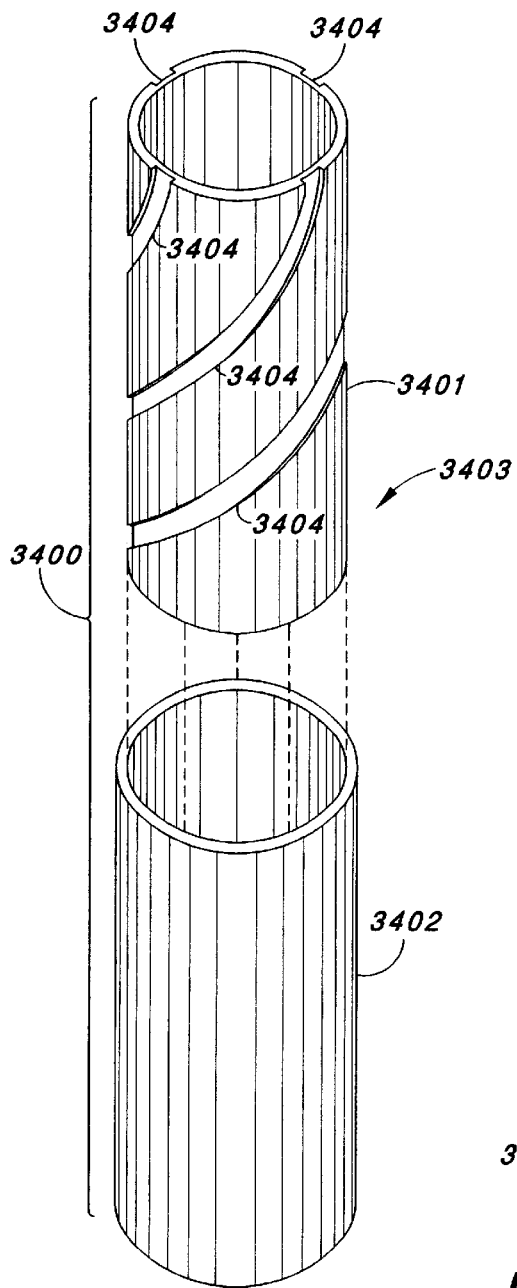
FIG. 34 is a perspective view showing assembly of a centerpost region of the conductive tube of FIGS. 23 through 25 incorporating channels within the conductive tube for use in heating or cooling and for control of current density pitch in accordance with a further embodiment of the present invention.

In another embodiment of the invention a resistive spiral strip can be induced in the centerpost region by heating a thermal spiral strip in a pure material conductive tube, such as made from copper, to higher temperature. Referring to FIG. 34, a perspective view is shown of an assembly of a centerpost region 3400 of first and second tubes 3401, 3402 of a conductive tube 2403. The first tube 3401 includes one or more spiraled channels 3404 for use in heating or cooling the conductive tube 3403 along a spiral path. These channels 1304 can be used to produce a hot helical strip in the centerpost region 3400 to cause a more resistive region than in the remaining base material, causing the current to flow in a spiral similar to the previously described spiral resistive strip embodiment in which different materials with different resistivities are used to produce the spiral current flow.

Referring to FIG. 35, a perspective view is shown of a partially assembled centerpost region 3400 of the conductive tube 3403 of FIG. 34 incorporating the one or more spiraled channels 3404 for use in heating or cooling. In practice, as shown, the second tube 3402 is placed over the first tube 3401 and the assembly brazed or otherwise assembled.

Figure 36:
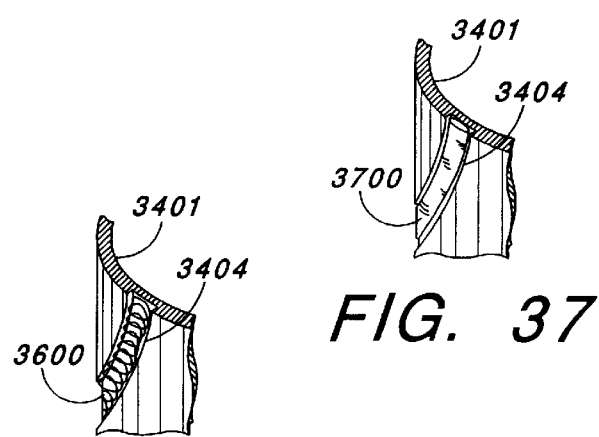
FIG. 36 is a partial perspective view of a portion of the conductive tube of FIG. 35 with a heating element in one of the channels.

Referring to FIG. 36, a partial perspective view is shown of a portion of the first tube 3401 of FIGS. 34 and 35 with a heating element 3600 in one of the channels 3404. This heating element 3600 allows heating of a thin spiral strip on the conducting tube 3403 creating a barrier to flow in a purely axial direction.

Figure 37:
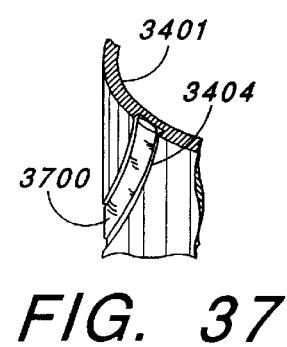
FIG. 37 is a partial perspective view of a portion of the conductive tube of FIG. 35 with a cooling water conduit in one of the channels.

Referring to FIG. 37, a partial perspective view is shown of a portion of the first tube 3401 of FIG. 35 with a cooling water conduit 3700 in one of the channels 3401. This coolant water channel 3700 can carry hot fluid to produce similar results to the heating element or can carry cooling fluid to achieve an opposite result.

Figure 38:
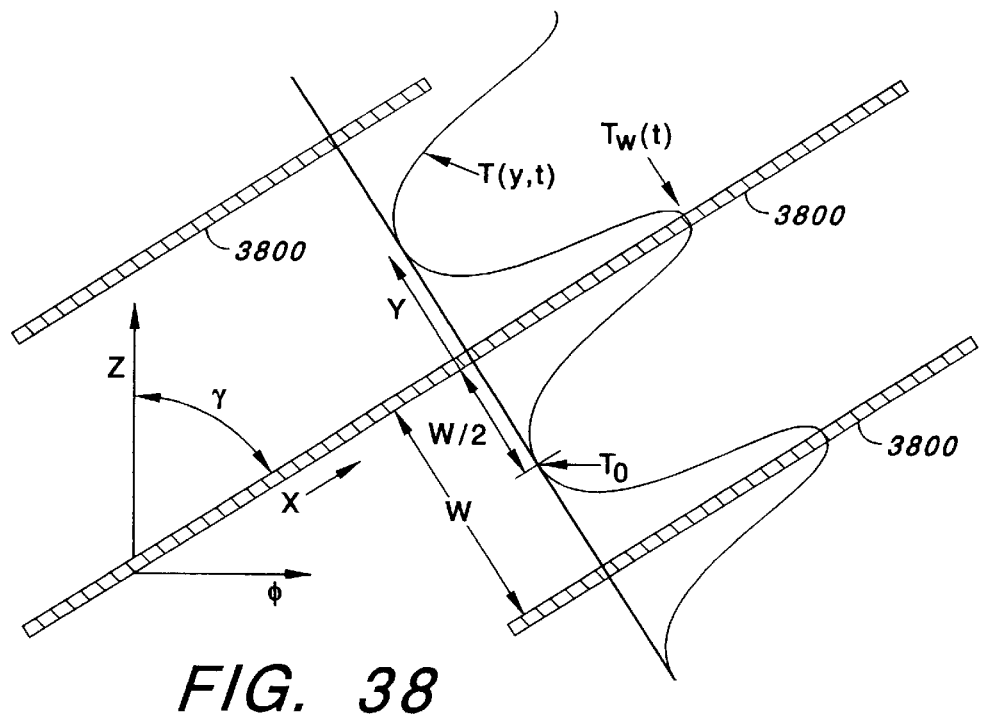
FIG. 38 is a schematic diagram of the geometry for a spiral-thermal strip that creates a temperature-induced resistive barrier to current flow, in accordance with a variation of the conductive tube of FIGS. 34 and 35.

Referring to FIG. 38, a schematic diagram is shown of geometry for another embodiment employing spiral thermal gradients to produce current pitch angle switching. A spiral-thermal strip 3800 that creates a temperature-induced resistive barrier to current flow, in accordance with a variation of the conductive tube of FIGS. 25 and 26 is shown. In accordance with the variation shown, the spiral-thermal strip 3800 on the centerpost region is generated using thermal gradients in a pure copper conductive tube as shown for example in FIGS. 34 and 35.

The spiral thermal strip 3800 can be induced in the pure copper (or superconductor) using a spiral wound cooling channel or a spiral wound heating element such as shown in FIGS. 34 through 37. This concept is much simpler to implement than other embodiments described herein because the basic conductive surface is pure copper and only an adjacent layer, i.e., coolant tubes or heating elements, have a spiral configuration.

Current flow analysis of this spiral thermal strip embodiment is more complex than for the spiral resistive strip described above, because of the time dependency of thermal diffusion. In the present embodiment, heat is introduced along an infinitesimally small spiral strip at time t=0. The spiral thermal path is denoted a "wall" boundary condition as is conventional in thermal diffusion problems. Initially, the wall temperature is $T_w$ and the conductive tube temperature is $T_o$. A quantity of heat $Q_o$ is input along the spiral strip with a pitch angle of γ. Constant heat input is assumed which corresponds to a constant resistive heat input from an external heating element.

At time t=$t_o$, temperature is at a predetermined maximum value at the "wall" and monotonically decreases away from the wall. At this time, supply voltage is applied to the conductive tube and current preferentially flows in the low-temperature spiral region and not through the higher temperature spiral strip of the thermal wall. However, the heat input along the thermal wall eventually diffuses into the low-temperature copper, and as the low-temperature copper heats up, the conductivity of the two regions becomes similar. The decreased conductivity, or increased resistivity, of the conductive tube's copper, in combination with the large currents through the conductive tube, results in additional ohmic heating ($I^2R$ heating) of the conductive tube. Eventually, the ohmic heating heats the entire conductive tube until the conductive tube's temperature reaches a uniform equilibrium. With the entire conductive tube at an equilibrium, the current flows in the axial direction only.

The problem can be modeled using a one dimensional transient heat conduction equation. Numerical integration of this equation results in an expression for the current density pitch ratio of:

$$\beta_J = \beta_J\left(\beta; \frac{\sigma_o}{\sigma_1}; \overline{R}\right)$$

where the dimensionless conductive tube radius ratio is:

$$\overline{R} = \frac{\pi R}{2N\sqrt{\alpha t}}$$

and the conductivity ratio $\sigma_o/\sigma_1$ is the ratio of initial conductivity to final conductivity. N is the number of spiral layers, α is the thermal diffusivity of the material and t is time.

Although a number of free parameters exist in the equations for the above-described thermally induced current path embodiment, a universal set of curves can be established for a pure copper cylinder based on dimensionless numbers: geometrical pitch, temperature ratio, and radius normalized by a diffusion length scale.

Figure 39:
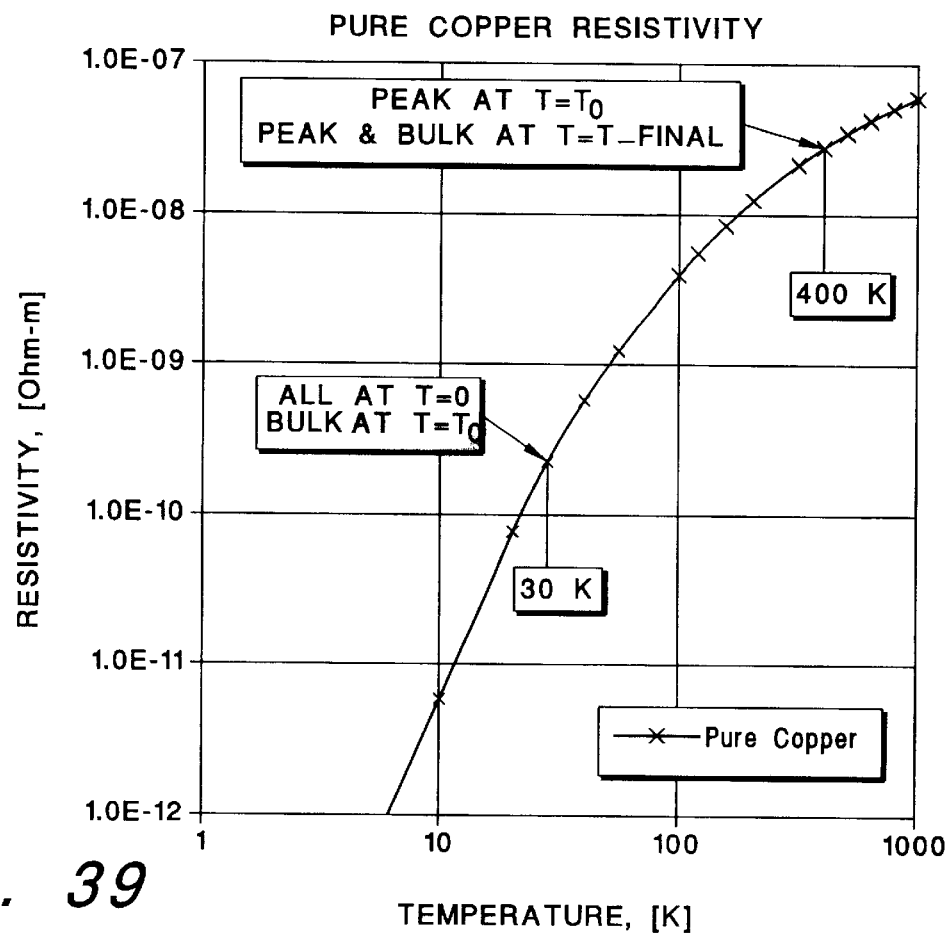
FIG. 39 is a graph of resistivity versus temperature for pure copper, such as may be used in the conductive tube of FIGS. 34 and 35 showing different operating points.

Referring to FIG. 39, a graph is shown of resistivity versus temperature for pure copper, such as may be used in the conductive tube of FIGS. 23 and 24, showing different operating points. Because the resistivity of copper is highly dependent on temperature, as shown, the spiral thermal region shown in FIG. 38 induces current to flow in a spiral path between spiral-thermal strips.

Figure 40:
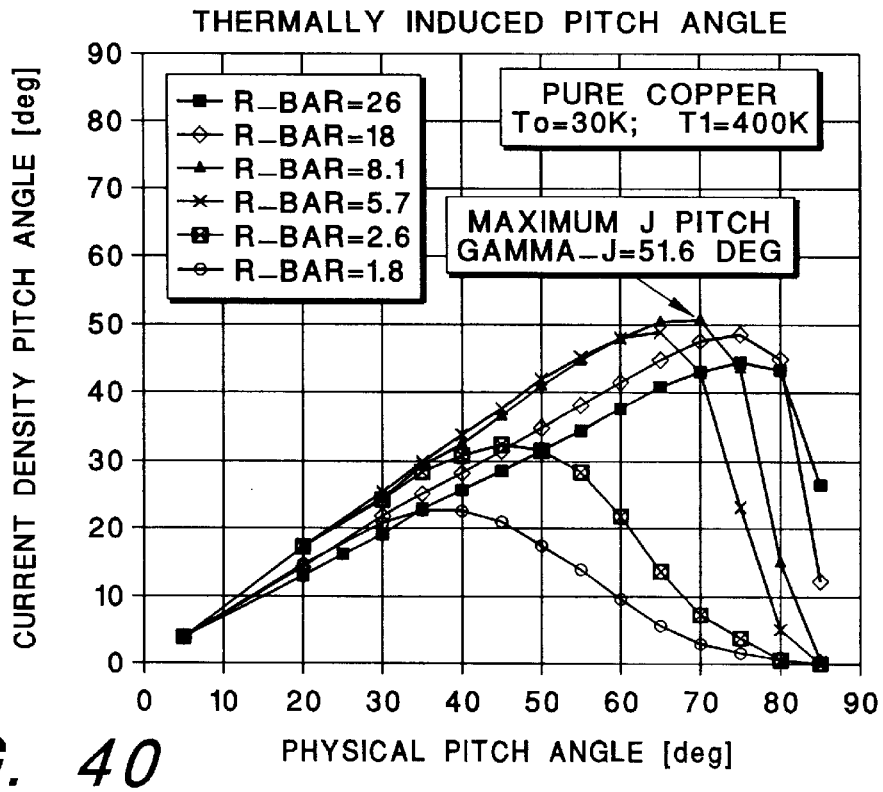
FIG. 40 is a graph showing current density pitch angle versus thermal strip pitch angle, at various conductive tube radius parameters, for a thermally-induced spiral resistive layer in a pure copper conductive tube, such as may be used in the conductive tube of FIGS. 34 and 35, operating between an initial temperature of 30 K and a final temperature of 400 K.

Referring to FIG. 40, a graph is shown of current density pitch angle versus thermal strip pitch angle, at various conductive tube radius parameters, for a thermally-induced spiral resistive layer in a pure copper conductive tube, such as may be used in the conductive tube of FIGS. 34 and 35, operating between an initial temperature of 30 K and a final temperature of 400 K.

FIG. 40 shows numerically generated solutions to the thermal equations based on operating copper between 30 K and 400 K. As before, the current density pitch is less than the geometrical pitch and the maximum current density pitch angle for each radius parameter is a unique function of the temperature range specified. The maximum pitch angle for each radius parameter in FIG. 40 can be determined by the functional minimization of the governing equation.

Figure 41:
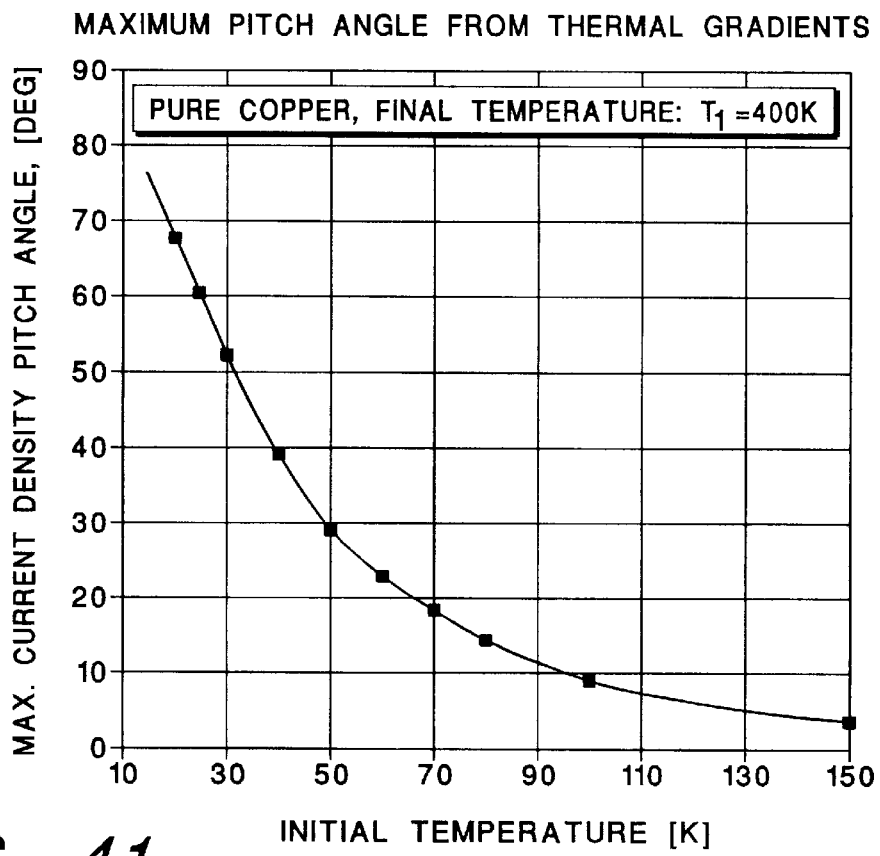
FIG. 41 is a graph of maximum current density pitch angle versus initial temperature for a pure copper conductive tube, such as may be used in the conductive tube of FIGS. 34 and 35, when heated to a final temperature of 400 K using a constant heat input.

Referring to FIG. 41, a graph is shown of maximum current density pitch angle versus initial temperature for a pure copper conductive tube, such as may be used in the conductive tube of FIGS. 34 and 35, that has a thermally-induced spiral resistive layer and that is heated to a final temperature of 400 K using a constant heat input. The maximum current density pitch angle depends very strongly on initial temperatures in the range between 10 K and 100 K.

As with the resistive path embodiment, the overall performance of the thermal path embodiment as shown substantially in FIG. 38 is predicted using the above equations based on a design that is within, for example, the DIII-D TFR geometry. The parameters needed to determine the maximum performance are provided by FIG. 41. The calculated results are shown in Table 2 below. Using an initial start temperature $T_o$ of 30 K, the magnet flux output is greater than nominal DIII-D TFR magnetic flux values by 46%. As mentioned before, use of this embodiment in a low aspect ratio design would essentially provide poloidal flux with little or no decrease in overall toroidal field performance.

Table 2: Comparisons flux output for thermal gradient spiral concept based on DIII-D TFR geometry operating between T=30 K and 400 K showing a 46% improvement in flux output.

| | |
|---|---|
| Initial Temperature | $T_0$ = 30 K |
| Final Temperature | $T_1$ = 400 K |
| $\gamma_{max}$ | 70.8 |
| $\gamma_{J\,max}$ | 51.7 |
| $\gamma_J$ @ 400K | 0 |
| $\Delta\beta_j$ | 1.26 |
| Flux: $\Delta\Phi$ | 14.6 $V_s$ |
| Flux DIII-D | 10 $V_s$ |

In another embodiment, the conductive surface is formed of superconducting materials. An advantage of using superconducting materials is that the conductivity ratio is infinite between the two regions of differing conductivity and, therefore, the geometrical pitch and current density pitch will be close to equal. In this embodiment the resistive spiral is formed of a superconductor having a higher critical temperature than a base superconductor's critical temperature. At high temperatures, e.g., 10 K, the spiral superconductor is in a normal conducting state while the base region (at 4.7 K) is a superconducting state. After the current is flowing through the superconducting portion of the conductive surface to generate both the poloidal magnetic field $B_\theta$ and the toroidal magnetic field $B_\phi$, the normally conducting strips's temperature is lowered, which causes the normal conducting zone between spirals of the spiral superconductor to also become superconductive such that the current through the conductive tube switches from a spiral direction to an axial direction. Thus, the conductive tube's temperature is decreased with time rather then increased. Alternatively, heat may be introduced into a strip on a superconducting tube. Local increase in temperature cause the strip to become normal conducting and thus change the current direction from axial to spiral.

In the foregoing description, a single directed pitch is used to describe a technique for directing current from toroidal to axial. Using a 2nd pitch with opposite direction, the current can be made to traverse from a positive toroidal direction, to cross through zero and to reverse direction as described in the time sequence shown in FIGS. 7 and 8.

While the invention herein disclosed has been described by means of specific embodiments and applications thereof, numerous modifications and variations could be made thereto by those skilled in the art without departing from the scope of the invention set forth in the claims.

For example, magnetically soft material (like pure iron) or magnetically hard materials (such as permanent magnets of carbon steel) can be used in regions of magnetic field production, such as in a transformer, to improve performance. Magnetic material can be inside the centerpost region, inside the toroidal region created by the bent cut outer legs, and connecting these regions to enhance the transfer of magnetic energy from and between these regions.

Other embodiments of the present invention include a variable transformer in which voltage in different cut outer legs are used for voltage increase or decrease depending on the electrical connections at peripheral connections of the variable transformer, or through modifications of these connections, or through modifications if a helical resistive strip in the centerpost region of such device.

By way of further example, an energy transfer device embodiment allows magnetic energy to be stored in a toroidal field region to be transferred to a primarily cylindrical field region for use, for example, in a rail gun to accelerate a projectile in the cylindrical field from energy stored in the toroidal field. A converse flow of energy can also be employed to transfer energy from a cylindrical field region to a toroidal field region, such as for confining plasma in a tokamak fusion reactor.

In yet a further example, a variable inductor device embodiment features a variable inductance controllable by connection of the cut outer legs through appropriate switching or through modification of the helical resistive strip in the centerpost region to change both resistance and inductance of such device.

As in an additional example, an energy storage device embodiment uses a single conductive tube with a 45 degree resistive strip pitch angle in the centerpost region to store magnetic energy in both toroidal and axial regions of space as for example in the storage of electrical energy in a superconducting magnetic energy storage (SMES) device.

What is claimed is:

1. An apparatus for creating and controlling a toroidal magnetic field, and a poloidal magnetic field, the apparatus comprising:
   a conductive tube with each of a first plurality cut outer legs bent outwardly to couple to corresponding ones of a second plurality of cut outer legs.

2. The apparatus of claim 1 wherein said conductive tube is one of a plurality of concentric conductive tubes with respective first pluralities of cut outer legs aligned, and with respective second pluralities of cut outer legs aligned.

3. The apparatus of claim 1 wherein said conductive tube includes a spiraled resistive centerpost region including at least one resistive strip in a spiral about a centerpost region of the conductive tube.

4. The apparatus of claim 1 wherein said conductive tube includes a centerpost region including a thermally-induced spiral resistive layer including at least one spiral-thermal strip in a spiral about the centerpost region.

5. The apparatus of claim 1 wherein said conductive tube includes a centerpost region including a spiraled superconductive region including a resistive spiral formed from a spiraled strip superconductor material and a base superconductor material, the spiraled strip superconductor material having a higher critical temperature than a critical temperature of a base superconductor.

6. An apparatus for creating and controlling a toroidal magnetic field, and a poloidal magnetic field, the apparatus comprising a conductive tube having a first end and a second end, the first end including a first portion and a second portion;
   a first power supply coupled between the first end and the second end for generating a first current $I_z$;
   and a second power supply coupled between the first portion and the second portion of the first end for generating a second current $I_\phi$.

7. The apparatus of claim 6 wherein said conductive tube is one of a plurality of concentric tubes.

8. The apparatus of claim 6 wherein said conductive tube includes a spiral resistive centerpost region, including at least one resistive strip in a spiral about a centerpost region of the conductive tube.

9. The apparatus of claim 6 wherein said conductive tube includes a centerpost region, including a thermally-induced spiral resistive layer including at least one spiral-thermal strip about the centerpost region.

10. The apparatus of claim 6 wherein said conductive tube includes a centerpost region, including a spiral superconductive region including a resistive spiral formed from a spiral strip of superconductor material and a base of superconductor material, the spiral strip of superconductor material having a higher critical temperature then a critical temperature of the base.

11. An apparatus for creating and controlling a toroidal magnetic field, and a poloidal magnetic field, the apparatus comprising:

a conductive centerpost for conducting a current through the conductive centerpost, the current having a time-varying azimuthal current density and a constant axial current density; and current switching means for switching a flow of the current in the conductive centerpost by further altering the time-varying azimuthal current density while maintaining the constant axial current density.

12. The apparatus of claim 11 wherein the conductive centerpost further comprises a plurality of layered surfaces.

13. The apparatus of claim 11 wherein the current switching means comprises:

spiraled resistive material for changing resistance along the conductive centerpost.

14. The apparatus of claim 11 wherein the current switching means comprises:

insulating material concentric with the surface of the conductive centerpost.

15. The apparatus of claim 11 wherein the current switching means comprises:

spiraled superconducting material.

16. The apparatus of claim 11 wherein the current switching means comprises:

a thermally-induced spiral resistive layer.

17. The apparatus of claim 11 wherein the current switching means comprises:

means for receiving a biasing current from a first power supply in an axial direction;

means for receiving a biasing current from a second power supply in an azimuthal direction.

18. The apparatus of claim 11 wherein the conductive centerpost comprises a conductive tube with each of a first plurality of cut outer legs bent outwardly to couple to corresponding ones of a second plurality of cut outer legs.

19. The apparatus of claim 18 wherein said conductive tube is one of a plurality of concentric conductive tubes with respective first pluralities of cut outer legs aligned, and with respective second pluralities of cut outer legs aligned.

20. The apparatus of claim 18 wherein said conductive tube includes a spiraled resistive region including at least one resistive strip in a spiral about a centerpost region of the conductive tube.

21. The apparatus of claim 18 wherein said conductive tube includes a centerpost region including a thermally-induced spiral resistive layer including at least one spiral-thermal strip about the centerpost region.

22. The apparatus of claim 18 wherein said conductive tube includes a centerpost region including a spiraled superconductive region including a resistive spiral formed from a spiraled strip superconductor material and a base superconductor material, the spiraled strip superconductor material having a higher critical temperature than a critical temperature of the base superconductor material.

23. The apparatus of claim 11 wherein the conductive centerpost comprises:

a conductive tube having a first end and a second end, the first end including a first portion and a second portion; and wherein the current switching means includes:

a first power supply coupled between the first end and the second end for generating a first current $I_z$; and a second power supply coupled between the first portion and the second portion of the first end for generating a second current $I_\phi$.

24. The apparatus of claim 23 wherein the conductive tube is one of a plurality of concentric tubes.

25. The apparatus of claim 23 wherein the conductive tube includes a spiral resistive region, including at least one resistive strip in a spiral about a centerpost region of the conductive tube.

26. The apparatus of claim 23 wherein the conductive tube includes a centerpost region, including a thermally-induced spiral resistive layer including at least one spiral-thermal strip about the centerpost region.

27. The apparatus of claim 23 wherein the conductive tube includes a centerpost region, including a spiral superconductive region including a resistive spiral formed from a strip of superconductor material and a base of superconducting material, the spiral strip superconductor material having a higher critical temperature than a critical temperature of the base.

28. An apparatus for creating and controlling a toroidal magnetic field, and a poloidal magnetic field, the apparatus comprising:

a conductive centerpost for conducting a current through the conductive centerpost, the current having an azimuthal current density that is time-varying and a constant axial current density; and means for altering the azimuthal current density.

* * * * *